US012748550B2

(12) United States Patent
Lee et al.

(10) Patent No.: US 12,748,550 B2
(45) **Date of Patent: *Sep. 29, 2026**

(54) SYSTEM AND METHOD OF HOST AND STORAGE DEVICE PATH SELECTION BY MEMORY DEVICE

(71) Applicant: SAMSUNG ELECTRONICS CO., LTD., Suwon-si (KR)

(72) Inventors: Chon Yong Lee, Suwon-si (KR); Jae-Gon Lee, Suwon-si (KR); Kyung-Chang Ryoo, Suwon-si (KR); Kyunghan Lee, Suwon-si (KR); Hyeyoung Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 12 days.

This patent is subject to a terminal disclaimer.

(21) Appl. No.: 18/947,682

(22) Filed: Nov. 14, 2024

(65) Prior Publication Data

US 2025/0068355 A1 Feb. 27, 2025

Related U.S. Application Data

(63) Continuation of application No. 18/142,331, filed on May 2, 2023, now Pat. No. 12,164,802.

(30) Foreign Application Priority Data

May 23, 2022 (KR) ........................ 10-2022-0063119

(51) Int. Cl.
*G06F 3/06* (2006.01)

(52) U.S. Cl.
CPC ............ *G06F 3/0656* (2013.01); *G06F 3/061* (2013.01); *G06F 3/0635* (2013.01); *G06F 3/0685* (2013.01)

(58) Field of Classification Search
CPC ...... G06F 3/0656; G06F 3/061; G06F 3/0635; G06F 3/0685
See application file for complete search history.

(56) References Cited

U.S. PATENT DOCUMENTS 6,393,458 B1 5/2002 Gigliotti et al.
7,254,620 B2 8/2007 Iwamura et al.
(Continued)

FOREIGN PATENT DOCUMENTS

EP 3385833 A1 10/2018
EP 3493046 A1 6/2019
(Continued)

*Primary Examiner* — Chie Yew
(74) *Attorney, Agent, or Firm* — Sughrue Mion, PLLC

(57) ABSTRACT

A method of operating storage devices, a memory device, a host device, and a switch, is provided. The method includes: receiving, by the memory device, a first request corresponding to target user data from the host device; generating, by the memory device, first input/output (I/O) stream information based on telemetry information corresponding to the storage devices and map data in a buffer memory of the memory device based on the first request, wherein the first I/O stream information indicates a data path between a first storage device of the storage devices and the host device; providing, by the memory device, a first redirection request including the first request and the first I/O stream information to the host device or the first storage device through the switch; and processing the target user data according to the first I/O stream information in the first redirection request.

20 Claims, 21 Drawing Sheets

(56) References Cited

U.S. PATENT DOCUMENTS

| | | | |
|---|---|---|---|
| 7,962,657 | B1 | 6/2011 | Zimran et al. |
| 10,264,060 | B1 | 4/2019 | Rao et al. |
| 10,860,223 | B1 * | 12/2020 | Li ......................... G06F 3/0659 |
| 11,061,604 | B2 | 7/2021 | Chou et al. |
| 2010/0153612 | A1 | 6/2010 | Zwisler et al. |
| 2018/0136875 | A1 | 5/2018 | Nimmagadda et al. |
| 2020/0183587 | A1 * | 6/2020 | Mak ........................ G06F 3/064 |
| 2021/0072907 | A1 | 3/2021 | Li |
| 2021/0232343 | A1 * | 7/2021 | Kim .................... G06F 11/1068 |
| 2021/0311871 | A1 | 10/2021 | Malladi et al. |
| 2021/0311895 | A1 | 10/2021 | Das Sharma |
| 2021/0314404 | A1 | 10/2021 | Glek |
| 2022/0035560 | A1 | 2/2022 | He et al. |

FOREIGN PATENT DOCUMENTS

| | | | |
|---|---|---|---|
| EP | 3905023 | A1 | 11/2021 |
| KR | 20180054394 | A | 5/2018 |

* cited by examiner

SYSTEM AND METHOD OF HOST AND STORAGE DEVICE PATH SELECTION BY MEMORY DEVICE

CROSS-REFERENCE TO RELATED APPLICATIONS

This application is a Continuation Application of U.S. application Ser. No. 18/142,331, filed on May 2, 2023, in the U.S. Patent and Trademark Office, now U.S. Pat. No. 12,164,802, which claims priority under 35 U.S.C. § 119 to Korean Patent Application No. 10-2022-0063119, filed on May 23, 2022, in the Korean Intellectual Property Office, the disclosure of which is incorporated by reference herein in its entirety.

BACKGROUND

The present disclosure relates to a storage device, and more particularly, relate to a computing system managing distributed storage devices, and a method of operating the same.

A memory device may store data in response to a write request and output data stored therein in response to a read request. For example, the memory device may be classified as a volatile memory device, which loses data stored therein when a power supply is interrupted, such as a dynamic random access memory (DRAM) device or a static RAM (SRAM) device, or a nonvolatile memory device, which retains data stored therein even when a power supply is interrupted, such as a flash memory device, a phase-change RAM (PRAM), a magnetic RAM (MRAM), or a resistive RAM (RRAM). The nonvolatile memory device may be used as a storage device storing a large amount of data.

Under control of a host, a storage device may store data or may output data stored therein. An input/output speed of the storage device may be determined based on various factors such as an operating state of the storage device, a bandwidth of an interface circuit, and a resource of the host.

As the capacity of the storage device increases, the burden on management of the host also increases. As such, there is required a technique for efficiently managing a large amount of data while minimizing the burden of the host.

SUMMARY

Embodiments provide a computing system managing distributed storage devices and a method of operating the same.

According to an aspect of an embodiment, a method of operating a computing system which includes a plurality of storage devices, a memory device, a host device, and a switch, is provided. The method includes: receiving, by the memory device, a first request corresponding to target user data from the host device through the switch; generating, by the memory device, first input/output (I/O) stream information based on telemetry information corresponding to the plurality of storage devices and a plurality of map data in a buffer memory of the memory device based on the first request, wherein the first I/O stream information indicates a data path between a first storage device of the plurality of storage devices and the host device; providing, by the memory device, a first redirection request comprising the first request and the first I/O stream information to the host device or the first storage device through the switch; and processing, by the host device or the first storage device, the target user data according to the first I/O stream information in the first redirection request.

According to an aspect of an embodiment, a method of operating a computing system which includes a plurality of storage devices, a memory device, a host device, and a switch and communicates with at least one additional computing system over a network, is provided. The method includes: periodically updating, by the memory device, telemetry information corresponding to the plurality of storage devices; periodically updating, by the memory device, at least one global telemetry information corresponding to the at least one additional computing system; receiving, by the memory device, a request corresponding to target user data from the host device through the switch; selecting, by the memory device, the computing system as a selected computing system among the computing system and the at least one additional computing system based on the request, the telemetry information, and the at least one global telemetry information; generating, by the memory device of the selected computing system, input/output (I/O) stream information based on the telemetry information and a plurality of map data in a buffer memory of the memory device based on the request, wherein the I/O stream information indicates a data path between a target storage device of the plurality of storage devices and the host device; providing, by the memory device, a redirection request comprising the request and the I/O stream information to the host device or the target storage device through the switch; and processing, by the host device or the target storage device, the target user data according to the I/O stream information in the redirection request.

According to an aspect of an embodiment, a computing system includes: a plurality of storage devices configured to store a plurality of user data; a memory device comprising a memory controller and a buffer memory configured to store a plurality of map data for managing the plurality of user data; a host device; and a switch configured to provide an interface between the plurality of storage devices, the memory device, and the host device. The memory controller is configured to: periodically update telemetry information corresponding to the plurality of storage devices; receive a request corresponding to target user data of the plurality of user data from the host device through the switch; generate input/output (I/O) stream information based on the telemetry information and the plurality of map data based on the request, wherein the I/O stream information indicates a path between a target storage device of the plurality of storage devices and the host device; and provide a redirection request comprising the request and the I/O stream information to the host device or the target storage device through the switch. The host device or the target storage device is configured to process the target user data according to the I/O stream information in the redirection request.

BRIEF DESCRIPTION OF DRAWINGS

The above and other aspects and features of the present disclosure will be more clearly understood from the following description of embodiments, taken in conjunction with the accompanying drawings.

DETAILED DESCRIPTION

Below, embodiments will be described with reference to the accompanying drawings. Embodiments described herein are provided as examples, and thus, the present disclosure is not limited thereto, and may be realized in various other forms. Each embodiment provided in the following description is not excluded from being associated with one or more features of another example or another embodiment also provided herein or not provided herein but consistent with the present disclosure.

Figure 1:
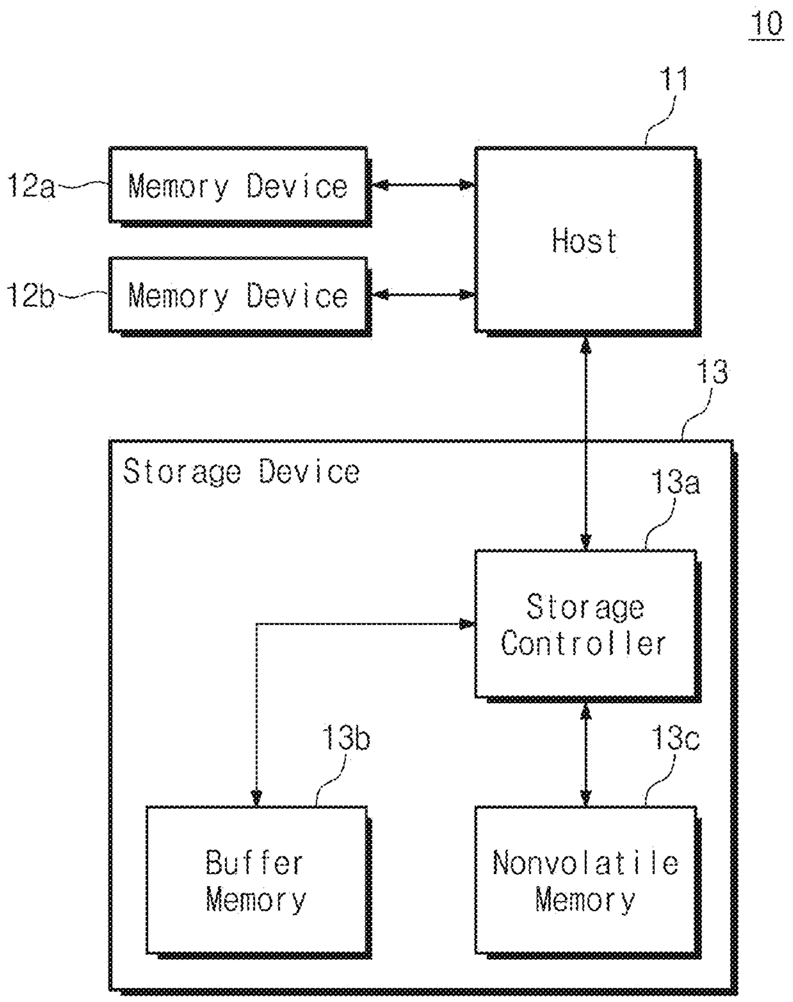
FIG. 1 is a block diagram of a computing system including a storage device.

FIG. 1 is a block diagram of a computing system including a storage device. Referring to FIG. 1, a computing system 10 may include a host 11, a plurality of memory devices 12*a* and 12*b*, and a storage device 13. The host 11 may control an overall operation of the computing system 10. The plurality of memory devices 12*a* and 12*b* may be used as a working memory or a system memory of the host 11.

The storage device 13 may include a storage controller 13*a*, a buffer memory 13*b*, and a nonvolatile memory 13*c*. Under control of the host 11, the storage controller 13*a* may store data in the nonvolatile memory 13*c* or may send data stored in the nonvolatile memory 13*c* to the host 11.

The buffer memory 13*b* may store a variety of information necessary for the storage device 13 to operate. For example, the storage controller 13*a* may manage data stored in the nonvolatile memory 13*c* by using map data. The map data may include information about relationship between a logical block address managed by the host 11 and a physical block address of the nonvolatile memory 13*c*.

In an embodiment, the buffer memory 13*b* may be a high-speed memory such as a DRAM. As the capacity of the nonvolatile memory 13*c* increases, the size of necessary map data may increase. However, because the capacity of the buffer memory 13*b* included in the single storage device 13 is limited, the buffer memory 13*b* may not be able to store the increased map data that is needed due to the increase in the capacity of the nonvolatile memory 13*c*.

Figure 2:
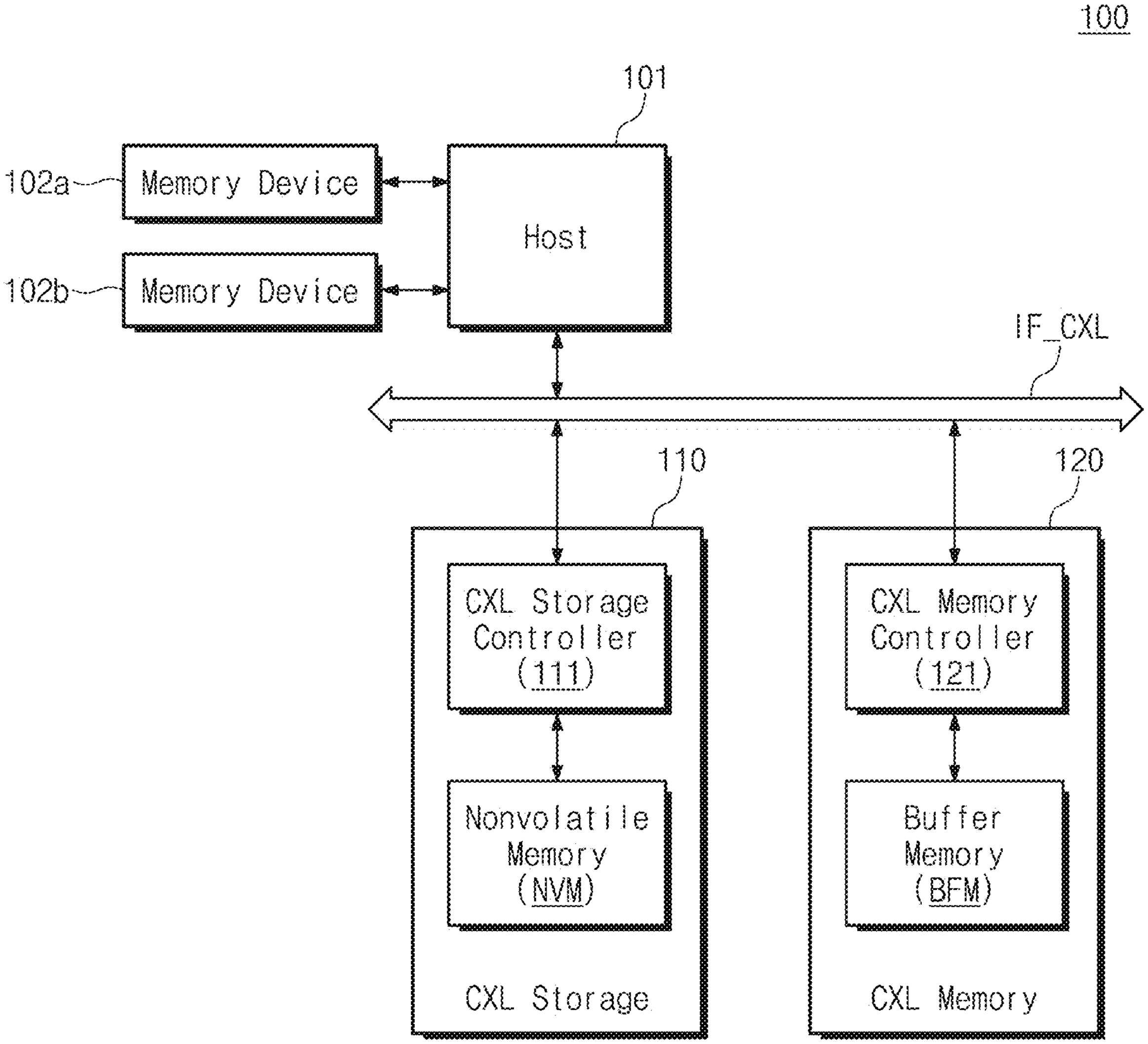
FIG. 2 is a block diagram of a computing system including a storage device according to an embodiment.

FIG. 2 is a block diagram of a computing system according to an embodiment. Referring to FIG. 2, a computing system 100 may include a host 101, a plurality of memory devices 102*a* and 102*b*, Compute eXpress Link (CXL) storage 110, and a CXL memory 120. In an embodiment, the computing system 100 may be included in user devices such as a personal computer, a laptop computer, a server, a media player, and a digital camera or automotive devices such as a navigation system, a black box, and an automotive electronic device/part. Alternatively, the computing system 100 may be a mobile system such as a mobile phone, a smartphone, a tablet personal computer (PC), a wearable device, a health care device, or an Internet of things (IoT) device.

The host 101 may control an overall operation of the computing system 100. In an embodiment, the host 101 may be one of various processors such as a central processing unit (CPU), a graphics processing unit (GPU), a neural processing unit (NPU), and a data processing unit (DPU). In an embodiment, the host 101 may include a single core processor or a multi-core processor.

The plurality of memory devices 102*a* and 102*b* may be used as a main memory or a system memory of the computing system 100. In an embodiment, each of the plurality of memory devices 102*a* and 102*b* may be a dynamic random access memory (DRAM) device and may have the form factor of the dual in-line memory module (DIMM). However, embodiments are not limited thereto. For example, the plurality of memory devices 102*a* and 102*b* may include a nonvolatile memory such as a flash memory, a phase change RAM (PRAM), a resistive RAM (RRAM), or a magnetic RAM (MRAM).

The plurality of memory devices 102*a* and 102*b* may each include an interface to directly communicate with the host 101, such as a Double Data Rate (DDR) interface. In an embodiment, the host 101 may include a memory controller configured to control the plurality of memory devices 102*a* and 102*b*. However, embodiments are not limited thereto. For example, the plurality of memory devices 102*a* and 102*b* may communicate with the host 101 through various interfaces.

The CXL storage 110 may include a CXL storage controller 111 and a nonvolatile memory NVM. Under control of the host 101, the CXL storage controller 111 may store data in the nonvolatile memory NVM or may send data stored in the nonvolatile memory NVM to the host 101. In an embodiment, the nonvolatile memory NVM may be a NAND flash memory, but embodiments are not limited thereto.

The CXL memory 120 may include a CXL memory controller 121 and a buffer memory BFM. Under control of the host 101, the CXL memory controller 121 may store data in the buffer memory BFM or may send data stored in the buffer memory BFM to the host 101. In an embodiment, the buffer memory BFM may be a DRAM, but embodiments are not limited thereto.

In an embodiment, the host 101, the CXL storage 110, and the CXL memory 120 may be configured to share the same interface. For example, the host 101, the CXL storage 110, and the CXL memory 120 may communicate with each other through a CXL interface IF_CXL. In an embodiment, the CXL interface IF_CXL may indicate a low-latency and high-bandwidth link that supports coherency, memory access, and dynamic protocol muxing of IO protocols such that various connections between accelerators, memory devices, or various electronic devices are possible.

In an embodiment, unlike the storage device 13 of FIG. 1, the CXL storage 110 may not include a separate buffer memory for storing or managing map data. In this case, the CXL storage 110 may require a buffer memory for storing or managing the map data. In an embodiment, at least a partial area of the CXL memory 120 may be used as a buffer memory of the CXL storage 110. In this case, a mapping table that is managed by the CXL storage controller 111 of the CXL storage 110 may be stored in the CXL memory 120. For example, at least a partial area of the CXL memory 120 may be allocated for a buffer memory of the CXL storage 110 (i.e., for an area dedicated for the CXL storage 110) by the host 101.

In an embodiment, the CXL storage 110 may access the CXL memory 120 through the CXL interface IF_CXL. For example, the CXL storage 110 may store the mapping table in the allocated area of the CXL memory 120 or may read the mapping table from the allocated area of the CXL memory 120. Under control of the CXL storage 110, the CXL memory 120 may store data (e.g., the map data) in the buffer memory BFM or may send the data (e.g., the map data) stored in the buffer memory BFM to the CXL storage 110.

As described with reference to FIG. 1, a related storage device 13 stores and manages the map data by using the buffer memory 13*b* included therein. As the capacity of the storage device 13 increases, the size of the map data increase, thereby causing an increase in the capacity of the buffer memory 13*b* included in the storage device 13. However, there is a limitation on an increase in capacity due to the structure and physical characteristic of the buffer memory 13*b* included in the storage device 13, in this case, the design change or additional integration of the buffer memory 13*b* is required.

In contrast, according to an embodiment, the CXL storage 110 may use at least a partial area of the CXL memory 120 placed outside the CXL storage 110 as a buffer memory. In this case, because the CXL memory 120 is implemented independently of the CXL storage 110, the CXL memory 120 may be implemented with a high-capacity memory. As such, even though the size of the map data increases due to an increase in the capacity of the CXL storage 110, the map data may be normally managed by the CXL memory 120.

In an embodiment, the storage controller 13*a* of the related storage device 13 communicates with the host 11 through the host interface such as PCIe or NVMe, and communicates with the buffer memory 13*b* through the memory interface such as a DDR interface or an LPDDR interface. That is, the storage controller 13*a* of the related storage device 13 communicates with the host 11 and the buffer memory 13*b* included therein, through different interfaces (i.e., heterogeneous interfaces).

In contrast, according to an embodiment, the CXL storage controller 111 of the CXL storage 110 may communicate with the host 101 and the CXL memory 120 (i.e., a buffer memory) through the CXL interface IF_CXL. In other words, the CXL storage controller 111 of the CXL storage 110 may communicate with the host 101 and the CXL memory 120 through a homogeneous interface or a common interface and may use a partial area of the CXL memory 120 as a buffer memory.

Below, for convenience of description, it is assumed that the host 101, the CXL storage 110, and the CXL memory 120 communicate with each other through the CXL interface IF_CXL. However, embodiments are not limited thereto. For example, the host 101, the CXL storage 110, and the CXL memory 120 may communicate with each other based on various computing interfaces complying with the following: GEN-Z protocol, NVLink protocol, Cache Coherent Interconnect for Accelerators (CCIX) protocol, and Open Coherent Accelerator Processor Interface (CAPI) protocol.

Figure 3:
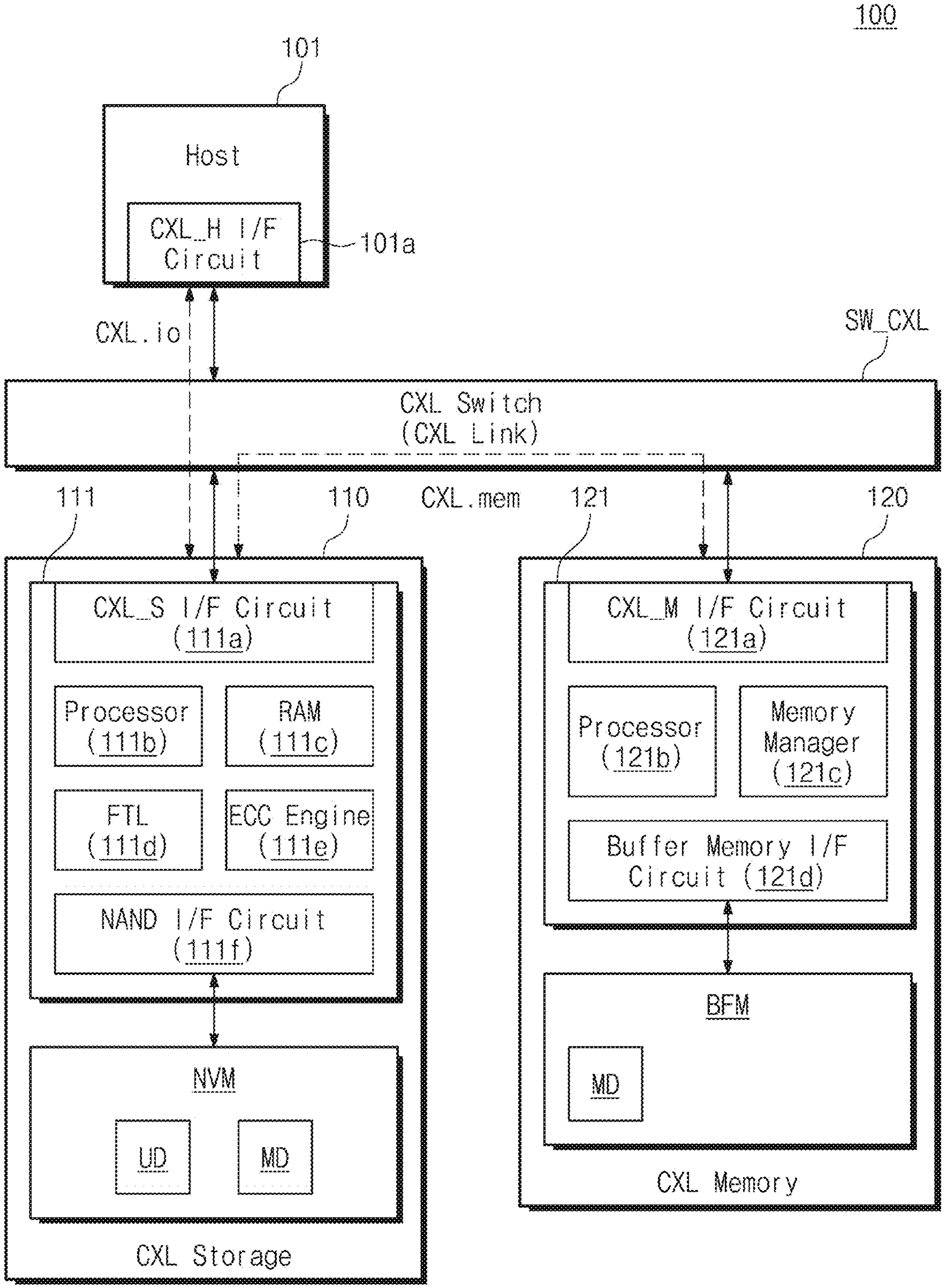
FIG. 3 is a block diagram illustrating a computing system according to an embodiment.

FIG. 3 is a block diagram illustrating a computing system of FIG. 2 in detail. Referring to FIGS. 2 and 3, the computing system 100 may include a CXL switch SW_CXL, the host 101, the CXL storage 110, and the CXL memory 120.

The CXL switch SW_CXL may be a component included in the CXL interface IF_CXL. The CXL switch SW_CXL may be configured to arbitrate the communication between the host 101, the CXL storage 110, and the CXL memory 120. For example, when the host 101 and the CXL storage 110 communicate with each other, the CXL switch SW_CXL may be configured to send information, which is provided from the host 101 or the CXL storage 110, such as a request, data, a response, or a signal to the CXL storage 110 or the host 101. When the host 101 and the CXL memory 120 communicate with each other, the CXL switch SW_CXL may be configured to send information, which is provided from the host 101 or the CXL memory 120, such as a request, data, a response, or a signal to the CXL memory 120 or the host 101. When the CXL storage 110 and the CXL memory 120 communicate with each other, the CXL switch SW_CXL may be configured to send information, which is provided from the CXL storage 110 or the CXL memory 120, such as a request, data, a response, or a signal to the CXL memory 120 or the CXL storage 110.

The host 101 may include a CXL host interface circuit 101*a*. The CXL host interface circuit 101*a* may communicate with the CXL storage 110 or the CXL memory 120 through the CXL switch SW_CXL.

In an embodiment, a configuration of the CXL storage 110 may be different from configurations of related storages. For example, the related storage device (e.g., an SSD including a DRAM buffer) stores and manages map data in the DRAM buffer included in the related storage device. In this case, a high-capacity DRAM buffer for storing the map data should be included in the related storage device. Alternatively, another type of related storage device (e.g., a DRAM-less SSD or a DRAM-less memory card) stores the entire map data in a nonvolatile memory (e.g., a NAND flash memory) included in the related storage device and loads and uses a portion of the map data onto an SRAM buffer. In this case, to load the map data, the nonvolatile memory, which has an operating speed lower than that of the DRAM buffer, is frequently performed, thereby reducing the performance of operation.

In contrast, the CXL storage 110 according to embodiments may not include a separate DRAM buffer configured to store the map data. In this case, map data MD may be stored and managed in the CXL memory 120 placed outside the CXL storage 110. As will be described below, because the CXL memory 120 supports a fast operating speed, the CXL storage 110 may have the same performance as the related storage device (e.g., a storage device including a DRAM). In addition, because the CXL memory 120 is placed outside the CXL storage 110, a large amount of map data of the CXL storage 110 may be managed.

The CXL storage 110 may include the CXL storage controller 111 and the nonvolatile memory NVM. The CXL storage controller 111 may include a CXL storage interface circuit 111*a*, a processor 111*b*, a RAM 111*c*, a flash translation layer (FTL) 111*d*, an error correction code (ECC) engine 111*e*, and a NAND interface circuit 111*f*.

The CXL storage interface circuit 111*a* may be connected with the CXL switch SW_CXL. The CXL storage interface circuit 111*a* may communicate with the host 101 or the CXL memory 120 through the CXL switch SW_CXL.

The processor 111*b* may be configured to control an overall operation of the CXL storage controller 111. The RAM 111*c* may be used as a working memory or a buffer memory of the CXL storage controller 111. In an embodiment, the RAM 111*c* may be an SRAM and may be used as a read buffer and a write buffer for the CXL storage 110. In an embodiment, as will be described below, the RAM 111*c* may be configured to temporarily store the map data MD read from the CXL memory 120 or a portion of the map data MD.

The FTL 111*d* may perform various management operations for efficiently using the nonvolatile memory NVM. For example, the FTL 111*d* may perform address translation between a logical block address managed by the host 101 and a physical block address used in the nonvolatile memory NVM, based on map data (or a mapping table). The FTL 111*d* may perform a bad block management operation for the nonvolatile memory NVM. The FTL 111*d* may perform a wear leveling operation for the nonvolatile memory NVM. The FTL 111*d* may perform a garbage collection operation for the nonvolatile memory NVM.

In an embodiment, the FTL 111*d* may be implemented in the form of hardware, firmware, or software, or in the form of a combination thereof. In the case where the FTL 111*d* is implemented in the form of firmware or software, program codes associated with the FTL 111*d* may be stored in the RAM 111*c* and may be driven by the processor 111*b*. In the case where the FTL 111*d* is implemented by hardware, hardware components configured to perform the above management operations may be implemented in the CXL storage controller 111.

The ECC engine 111*e* may perform error detection and correction on data read from the nonvolatile memory NVM. For example, the ECC engine 111*e* may generate parity bits for user data UD to be stored in the nonvolatile memory NVM, and the parity bits thus generated may be stored in the nonvolatile memory NVM together with the user data UD. When the user data UD are read from the nonvolatile memory NVM, the ECC engine 111*e* may detect and correct an error of the user data UD by using the parity bits read from the nonvolatile memory NVM together with the user data UD.

The NAND interface circuit 111*f* may control the nonvolatile memory NVM such that data are stored in the nonvolatile memory NVM or data are read from the nonvolatile memory NVM. In an embodiment, the NAND interface circuit 111*f* may be implemented to comply with the standard protocol such as a toggle interface or Open NAND Flash Interface (ONFI). For example, the nonvolatile memory NVM may include a plurality of NAND flash devices, in the case where the NAND interface circuit 111*f* is implemented based on the toggle interface, the NAND interface circuit 111*f* may communicate with the plurality of NAND flash devices through a plurality of channels. The plurality of NAND flash devices may be connected with the plurality of channels through a multi-channel, multi-way structure.

The NAND interface circuit 111*f* may send a chip enable signal /CE, a command latch enable signal CLE, an address latch enable signal ALE, a read enable signal /RE and a write enable signal /WE to the plurality of NAND flash devices through the plurality of channels. The NAND interface circuit 111*f* and each NAND flash device may exchange a data signal DQ and a data strobe signal DQS through each channel.

TABLE 1

| /CE | CLE | ALE | /WE | /RE | DQS | DQx | MODE |
|---|---|---|---|---|---|---|---|
| L | H | L | ↑ | H | X | CMD | Command Input |
| L | L | H | ↑ | H | X | ADDR | Address Input |
| L | L | L | H | H | ↑↓ | DATA_in | Data Input |
| L | L | L | H | ↑↓ | ↑↓ | DATA_out | Data Output |

Table 1 shows operating modes of a NAND flash device according to a state of each signal. Referring to Table 1, while the NAND flash device receives a command CMD or an address ADDR or receives/outputs data "DATA", the chip enable signal /CE maintains a low state "L". During a command input mode, the NAND interface circuit 111*f* may control signal lines such that the command latch enable signal CLE has a high level "H", the address latch enable signal ALE has the low level "L", the write enable signal /WE toggles between the high level "H" and the low level "L" and the read enable signal /RE has the high level "H". During the command input mode, the NAND interface circuit 111*f* may send the command CMD to the NAND flash device through data signals DQx in synchronization with the rising edge ↑ of the write enable signal /WE. The NAND flash device may identify the command CMD from the data signals DQx in response to the rising edge ↑ of the write enable signal /WE. During an address input mode, the NAND interface circuit 111*f* may control signal lines such that the command latch enable signal CLE has the low level "L", the address latch enable signal ALE has the high level "H", the write enable signal /WE toggles between the high level "H" and the low level "L", and the read enable signal /RE has the high level "H". During the address input mode, the NAND interface circuit 111*f* may send the address ADDR to the NAND flash device through the data signals DQx in synchronization with the rising edge ↑ of the write enable signal /WE. The NAND flash device may identify the address ADDR from the data signals DQx in response to the rising edge ↑ of the write enable signal /WE. In an embodiment, the address ADDR may be a value corresponding to a physical block address of the NAND flash device.

During a data input mode, the NAND interface circuit 111*f* may control signal lines such that the command latch enable signal CLE has the low level "L", the address latch enable signal ALE has the low level "L", the write enable signal /WE has the high level "H", the read enable signal /RE has the high level "H", and the data strobe signal DQS toggles between the high level "H" and the low level "L". During the data input mode, the NAND interface circuit 111*f* may send the data "DATA" to the NAND flash device through the data signals DQx in synchronization with the rising edge and the falling edge ↓ of the data strobe signal DQS. The NAND flash device may identify the data "DATA" from the data signals DQx in response to the rising edge ↑ and the falling edge ↓ of the data strobe signal DQS.

During a data output mode, the NAND interface circuit 111*f* may control signal lines that the command latch enable signal CLE has the low level "L", the address latch enable signal ALE has the low level "L", the write enable signal H has the high level "H", and the read enable signal /RE toggles between the high level "H" and the low level "L". During the data output mode, the NAND flash device may generate the data strobe signal DQS toggling between the high level "H" and the low level "L" in response to the read enable signal /RE. The NAND flash device may send the data "DATA" to the NAND interface circuit 111*f* through the data signals DQx in synchronization with the rising edge ↑ and the falling edge ↓ of the data strobe signal DQS. The NAND interface circuit 111*f* may identify the data "DATA" from the data signals DQx in response to the rising edge ↑ and the falling edge ↓ of the data strobe signal DQS.

The toggle interface described above is an example, and embodiments are not limited thereto.

The nonvolatile memory NVM may store or output the user data UD under control of the CXL storage controller 111. The nonvolatile memory NVM may store or output the map data MD under control of the CXL storage controller 111. In an embodiment, the map data MD stored in the nonvolatile memory NVM may include mapping information corresponding to the entire user data UD stored in the nonvolatile memory NVM. The map data MD stored in the nonvolatile memory NVM may be stored in the CXL memory 120 in the initialization operation of the CXL storage 110.

The CXL memory 120 may include the CXL memory controller 121 and the buffer memory BFM. The CXL memory controller 121 may include a CXL memory interface circuit 121*a*, a processor 121*b*, a memory manager 121*c*, and a buffer memory interface circuit 121*d*.

The CXL memory interface circuit 121*a* may be connected with the CXL switch SW_CXL. The CXL memory interface circuit 121*a* may communicate with the host 101 or the CXL storage 110 through the CXL switch SW_CXL.

The processor 121*b* may be configured to control an overall operation of the CXL memory controller 121. The memory manager 121*c* may be configured to manage the buffer memory BFM. For example, the memory manager 121*c* may be configured to translate a memory address (e.g., a logical address or a virtual address) from the host 101 or the CXL storage 110 into a physically address for the buffer memory BFM. In an embodiment, the memory address that is an address for managing a storage area of the CXL memory 120 may be a logical address or a virtual address that is designated and managed by the host 101.

The buffer memory interface circuit 121*d* may control the buffer memory BFM such that data are stored in the buffer memory BFM or data are read from the buffer memory BFM. In an embodiment, the buffer memory interface circuit 121*d* may be implemented to comply with the standard protocol such as a DDR interface or an LPDDR interface.

Under control of the CXL memory controller 121, the buffer memory BFM may store data or may output the stored data. In an embodiment, the buffer memory BFM may be configured to store the map data MD that are used in the CXL storage 110. The map data MD may be transferred from the CXL storage 110 to the CXL memory 120 when the computing system 100 is initialized or the CXL storage 110 is initialized.

As described above, the CXL storage 110 according to an embodiment may store the map data MD, which are necessary to manage the nonvolatile memory NVM, in the CXL memory 120 connected through the CXL switch SW_CXL (or the CXL interface IF_CXL). Afterwards, when the CXL storage 110 performs the read operation according to a request of the host 101, the CXL storage 110 may read at least a portion of the map data MD from the CXL memory 120 through the CXL switch SW_CXL (or the CXL interface IF_CXL) and may perform the read operation based on the map data MD thus read. Alternatively, when the CXL storage 110 performs the write operation according to a request of the host 101, the CXL storage 110 may perform the write operation on the nonvolatile memory NVM and may update the map data MD. In this case, the updated map data MD may be first stored in the RAM 111*c* of the CXL storage controller 111, and the map data MD stored in the RAM 111*c* may be transferred to the buffer memory BFM of the CXL memory 120 through the CXL switch SW_CXL (or the CXL interface IF_CXL), so as to be updated in the buffer memory BFM.

In an embodiment, at least a partial area of the buffer memory BFM of the CXL memory 120 may be allocated for a dedicated area for the CXL storage 110, and the remaining area may be used as an area that is capable of being accessed by the host 101.

In an embodiment, the host 101 and the CXL storage 110 may communicate with each other by using an input/output protocol, such as CXL.io. The CXL.io may be a PCIe-based non-coherency input/output protocol. The host 101 and the CXL storage 110 may exchange user data or variety of information with each other by using the CXL.io.

In an embodiment, the CXL storage 110 and the CXL memory 120 may communicate with each other by using a memory access protocol, such as CXL.mem. The CXL.mem may be a memory access protocol that supports memory access. The CXL storage 110 may access a partial area (e.g., an area where the map data MD are stored or a CXL storage-dedicated area) of the CXL memory 120 by using the CXL.mem.

In an embodiment, the host 101 and the CXL memory 120 may communicate with each other by using CXL.mem. The host 101 may access, as a system memory, the remaining area (e.g., the remaining area other than the area where the map data MD are stored or the remaining area other than the CXL storage-dedicated area) of the CXL memory 120 by using the CXL.mem.

The above access types including CXL.io and CXL.mem are provided as an example, and embodiments are not limited thereto.

In an embodiment, the CXL storage 110 and the CXL memory 120 may be installed in a CXL interface-based physical port (e.g., a PCIe physical port). In an embodiment, the CXL storage 110 and the CXL memory 120 may be implemented based on the E1.S, E1.L, E3.S, E3.L, or PCIe AIC (CEM) form factor. Alternatively, the CXL storage 110 and the CXL memory 120 may be implemented based on the U.2 form factor, the M.2 form factor, various types of PCIe-based form factors, or various types of small form factors. As will be described with reference to FIG. 14, the CXL storage 110 and the CXL memory 120 may be implemented with various types of form factors, and may support a function of a hot-plug capable of being installed in or removed from the physical port.

In an embodiment, the CXL memory 120 may manage user data of distributed CXL storages. In this case, the CXL memory 120 may operate as a distribution file manager, and may receive a request (e.g., a read request or a write request) for the user data UD from the host 101 through the CXL switch SW_CXL.

Figure 4:
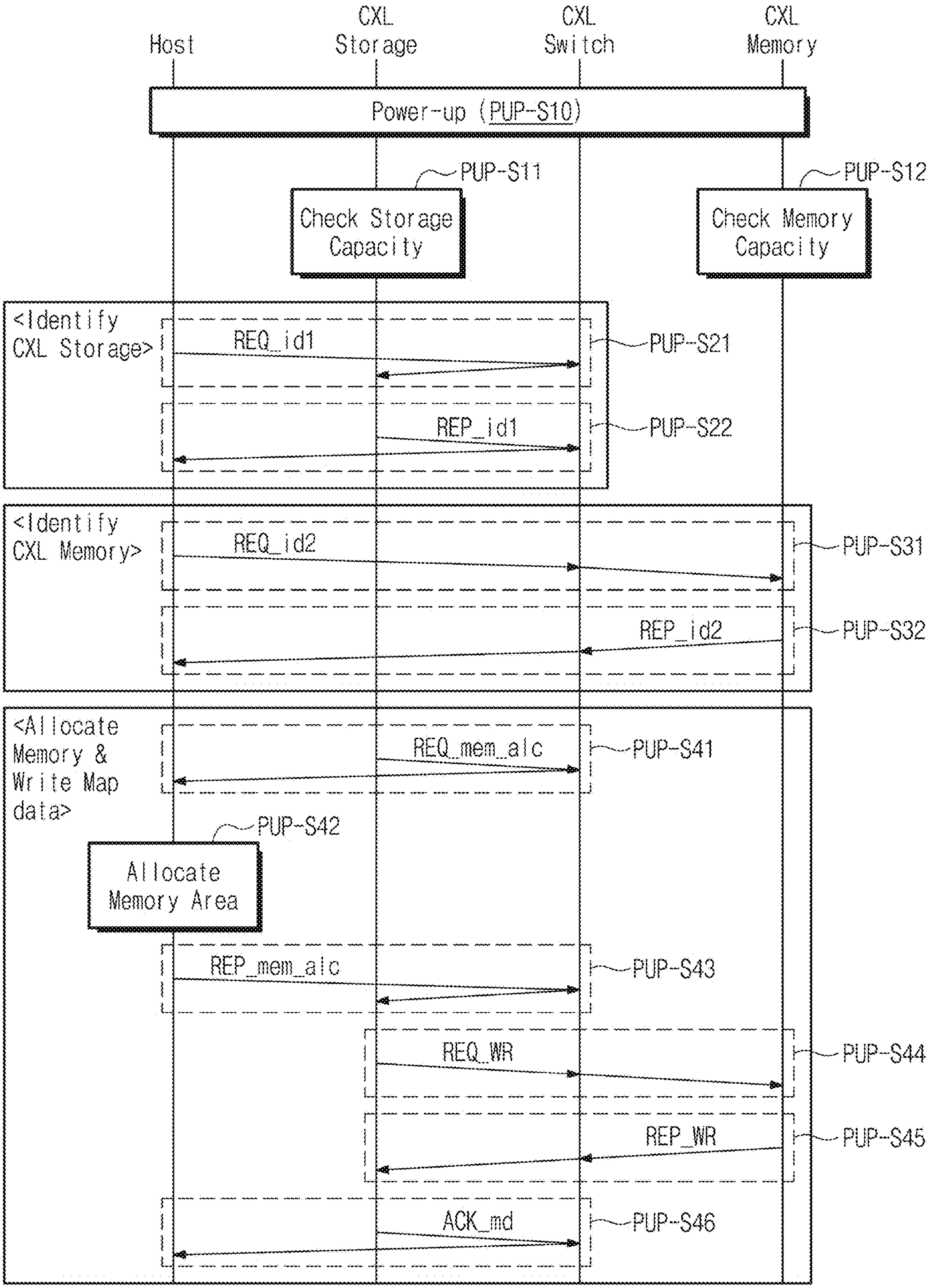
FIG. 4 is a flowchart illustrating an initialization operation or a power-up operation of a computing system according to an embodiment.

FIG. 4 is a flowchart illustrating an initialization operation or a power-up operation of a computing system of FIG. 3. Referring to FIGS. 3 and 4, in operation PUP-S10, the computing system 100 may be powered up. When the computing system 100 is powered up, the host 101 may send information about power-up or initialization start to the CXL storage 110, the CXL switch SW_CXL, and the CXL memory 120. In response to the power-up or initialization start information, each of the CXL storage 110, the CXL switch SW_CXL, and the CXL memory 120 may perform an individual initialization operation.

In operation PUP-S11, the CXL storage 110 may check a storage capacity (i.e., a capacity of the nonvolatile memory NVM). For example, the CXL storage 110 may check the storage capacity of the nonvolatile memory NVM in response to the information about power-up or initialization start.

In operation PUP-S12, the CXL memory 120 may check a memory capacity (i.e., a capacity of the buffer memory BFM). For example, the CXL memory 120 may check the capacity of the buffer memory BFM in response to the power-up or initialization start information.

The host 101 may recognize information of the CXL storage 110 through operation PUP-S21 and operation PUP-S22. For example, in operation PUP-S21, the host 101 may issue a first device information request REQ_id1 for recognizing device information of the CXL storage 110 through the CXL host interface circuit 101*a*. The first device information request REQ_id1 may be transferred to the CXL switch SW_CXL. The CXL switch SW_CXL may transfer the first device information request REQ_id1 to the CXL storage 110 targeted for the first device information request REQ_id1.

In operation PUP-S22, the CXL storage 110 may output a first device information response REP_id1 through the CXL storage interface circuit 111*a* in response to the first device information request REQ_id1 received from the CXL switch SW_CXL. The first device information response REP_id1 may be transferred to the CXL switch SW_CXL. The CXL switch SW_CXL may transfer the first device information response REP_id1 to the host 101 targeted for the first device information response REP_id1.

The host 101 may identify the device information of the CXL storage 110 in response to the first device information response REP_id1 received from the CXL switch SW_CXL. In an embodiment, the first device information response REP_id1 may include information about a device type and a storage capacity of the CXL storage 110.

The host 101 may recognize information of the CXL memory 120 through operation PUP-S31 and operation PUP-S32. For example, in operation PUP-S31, the host 101 may issue a second device information request REQ_id2 for recognizing device information of the CXL memory 120 through the CXL host interface circuit 101*a*. The second device information request REQ_id2 may be transferred to the CXL switch SW_CXL. The CXL switch SW_CXL may transfer the second device information request REQ_id2 to the CXL memory 120 targeted for the second device information request REQ_id2.

In operation PUP-S32, the CXL memory 120 may output a second device information response REP_id2 through the CXL memory interface circuit 121*a* in response to the second device information request REQ_id2 received from the CXL switch SW_CXL. The second device information response REP_id2 may be transferred to the CXL switch SW_CXL. The CXL switch SW_CXL may transfer the second device information response REP_id2 to the host 101 targeted for the second device information response REP_id2.

The host 101 may identify the device information of the CXL memory 120 in response to the second device information response REP_id2 received from the CXL switch SW_CXL. In an embodiment, the second device information response REP_id2 may include information about a device type and a storage capacity of the CXL memory 120.

As described above, the host 101 may identify the information about the device types (e.g., a storage type and a memory type) and capacities of the CXL storage 110 and the CXL memory 120 through operation PUP-S21 to operation PUP-S32.

The host 101 may allocate at least a partial area of the CXL memory 120 for an area dedicated for the CXL storage 110 through operation PUP-S41 to operation PUP-S46. For example, in operation PUP-S41, the CXL storage 110 may output a memory allocation request REQ_mem_alc through the CXL storage interface circuit 111*a*. The memory allocation request REQ_mem_alc may be transferred to the CXL switch SW_CXL. The CXL switch SW_CXL may transfer the memory allocation request REQ_mem_alc to the host 101. In an embodiment, the memory allocation request REQ_mem_alc may refer to an allocation request for an area, which is to be used as a dedicated area of the CXL storage 110, from among areas of the CXL memory 120.

In operation PUP-S42, the host 101 may allocate at least a partial area of the CXL memory 120 for the dedicated area of the CXL storage 110 in response to the memory allocation request REQ_mem_alc. For example, the host 101 may determine a buffer capacity required by the CXL storage 110 based on the storage capacity of the CXL storage 110. The host 101 may allocate the area of the CXL memory 120, which corresponds to the determined buffer capacity, for the dedicated area of the CXL storage 110.

In operation PUP-S43, the host 101 may output a memory allocation response REP_mem_alc through the CXL host interface circuit 101*a*. The memory allocation response REP_mem_alc may be transferred to the CXL switch SW_CXL. The CXL switch SW_CXL may transfer the memory allocation response REP_mem_alc to the CXL storage 110 targeted for the memory allocation response REP_mem_alc. In an embodiment, the memory allocation response REP_mem_alc may include information about a device identifier of the CXL memory 120 and a memory address (e.g., a logical address range or a virtual address range) of an area of the CXL memory 120, which is allocated for a dedicated area of the CXL memory 120.

The CXL storage 110 may identify the area of the CXL memory 120, which is dedicated for the CXL storage 110, based on the memory allocation response REP_mem_alc.

In operation PUP-S44, the CXL storage 110 may output a write request REQ_WR through the CXL storage interface circuit 111*a*. The write request REQ_WR may be transferred to the CXL switch SW_CXL. The CXL switch SW_CXL may transfer the write request REQ_WR to the CXL memory 120 targeted for the write request REQ_WR. The CXL memory 120 may perform the write operation in response to the write request REQ_WR.

In operation PUP-S45, the CXL memory 120 may output, through the CXL memory interface circuit 121*a*, a write response REP_WR providing notification that the write request is completed. The CXL switch SW_CXL may transfer the write response REP_WR to the CXL storage 110 targeted for the write response REP_WR. The CXL storage 110 may recognize that the write operation is completely performed on the CXL memory 120, in response to the write response REP_WR.

In an embodiment, the write request REQ_WR may refer to a request for storing the map data MD present in the nonvolatile memory NVM of the CXL storage 110 in the dedicated area of the CXL memory 120. That is, the write request REQ_WR may include address information about the map data MD and the dedicated area. Through operation PUP-S44 and operation PUP-S45, the map data MD present in the CXL storage 110 may be stored in the dedicated area of the CXL memory 120.

In operation PUP-S46, the CXL storage 110 may output acknowledge information ACK_md through the CXL storage interface circuit 111*a*. The CXL switch SW_CXL may transfer the acknowledge information ACK_md to the host 101. In response to the acknowledge information ACK_md, the host 101 may recognize that the CXL storage 110 stores the map data MD in the CXL memory 120. Afterwards, the host 101, the CXL storage 110, and the CXL memory 120 may perform a normal operation (e.g., a read operation or a write operation).

In an embodiment, the CXL memory 120 may manage user data of distributed CXL storages. In this case, unlike the example illustrated in FIG. 4, the CXL memory 120 may independently perform memory allocation. For example, in operation PUP-S41, the CXL memory 120 may provide the memory allocation request REQ_mem_alc to the host 101. In operation PUP-S43, the host 101 may provide the memory allocation response REP_mem_alc to the CXL memory 120. In operation PUP-S44, the CXL memory 120 may internally perform the write operation for the map data MD based on the memory allocation response REP_mem_alc of the host 101. Operation PUP-S45 may be omitted. In operation PUP-S46, the CXL memory 120 may provide the acknowledge information ACK_md to the host 101.

Figure 5:
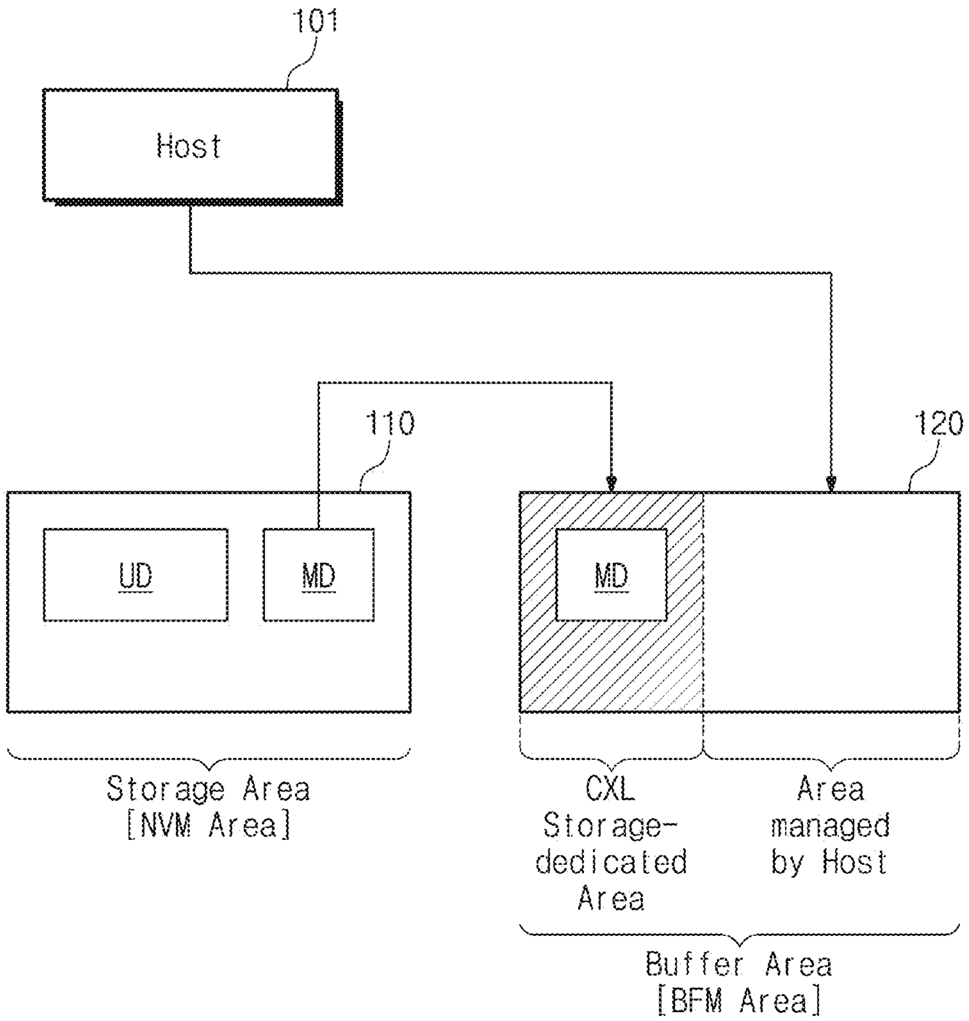
FIG. 5 is a diagram describing an operation in which a computing system stores map data according to an embodiment.

FIG. 5 is a diagram describing an operation in which a computing system of FIG. 4 stores map data. For convenience of description and for brevity of drawing, components of the host 101, the CXL storage 110, and the CXL memory 120 are conceptually illustrated, and some unnecessary components are omitted.

Referring to FIGS. 3 to 5, the host 101 may allocate a partial area of the CXL memory 120 for a dedicated area of the CXL storage 110. In this case, the dedicated area of the CXL memory 120 may be accessed by the CXL storage 110 and may be used to store map data of the CXL storage 110.

For example, as illustrated in FIG. 5, the nonvolatile memory NVM of the CXL storage 110 may store the user data UD and the map data MD. As described above, because the CXL storage 110 does not include a separate buffer memory, the CXL storage 110 may require a buffer area in which the map data MD are to be stored. According to an embodiment, the map data MD of the CXL storage 110 may be stored in a partial area (e.g., a dedicated area allocated by the host 101) of the CXL memory 120. In this case, the dedicated area of the CXL memory 120 may be accessed by the CXL storage 110 through the CXL switch SW_CXL.

In an embodiment, the remaining area of the CXL memory 120, which is not allocated, other than the dedicated area may be an area that is accessible by the host 101 or is managed by the host 101. In this case, the host 101 may access the remaining area of the CXL memory 120 through the CXL switch SW_CXL. In an embodiment, the remaining area of the CXL memory 120, which is not allocated for the dedicated area, may be used as a memory expander.

As described above, according to the request of the CXL storage 110, the host 101 may allocate at least a partial area of the CXL memory 120 for the dedicated area of the CXL storage 110. In this case, the CXL storage 110 may access a portion of the CXL memory 120, which is allocated for the dedicated area, and the host 101 may access the remaining area of the CXL memory 120 (i.e., the remaining area other than the dedicated area thus allocated). In an embodiment, both the access of the CXL storage 110 to the CXL memory 120 and the access of the host 101 to the CXL memory 120 may be performed through the same interface (e.g., a CXL interface or a CXL switch).

In an embodiment, when the system memory of the host 101 is insufficient, the host 101 may retrieve (or recover) the dedicated area of the CXL memory 120, which allocated to the CXL storage 110 (i.e., an area for storing map data). The retrieved (or recovered) dedicated area may be used as the system memory by the host 101.

Figure 6:
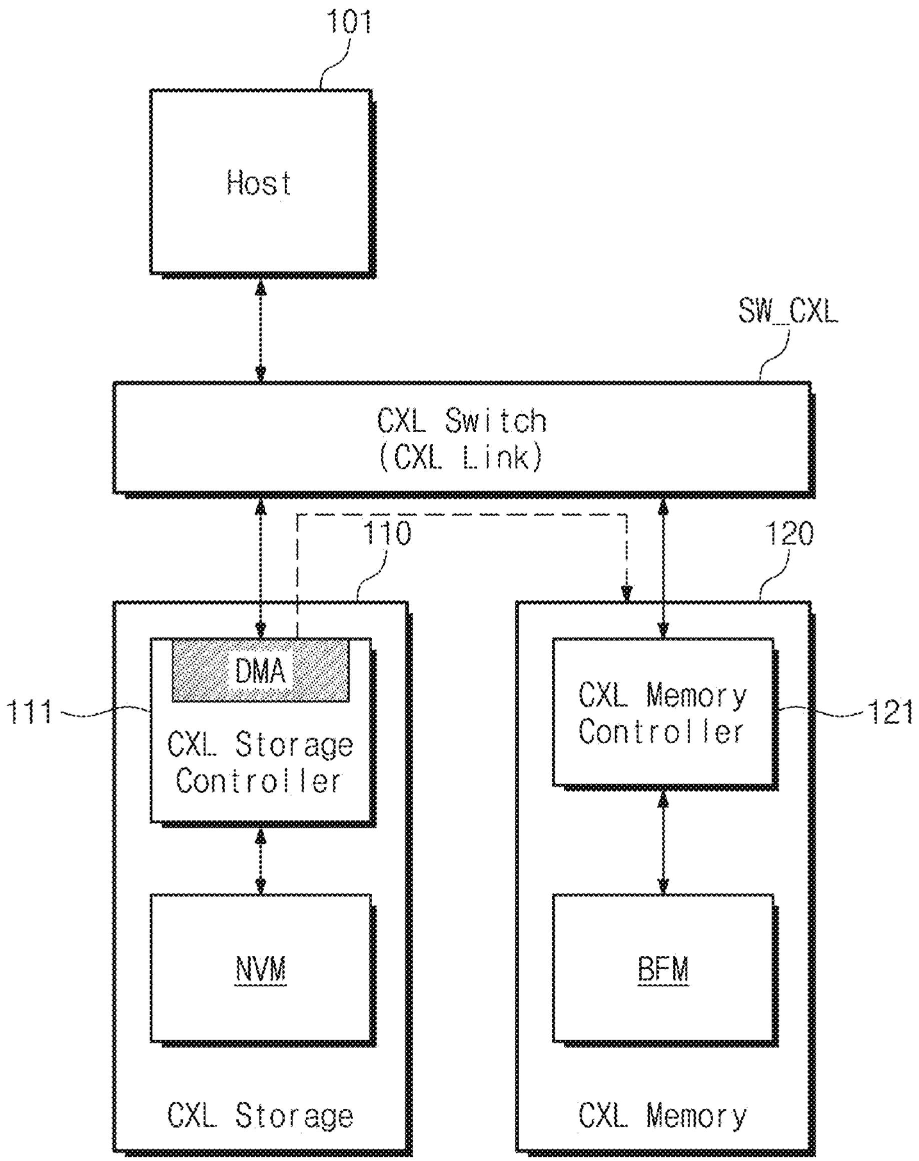
FIGS. 6 and 7 are diagrams describing an operation in which map data are stored in a CXL memory according to an embodiment.
Figure 7:
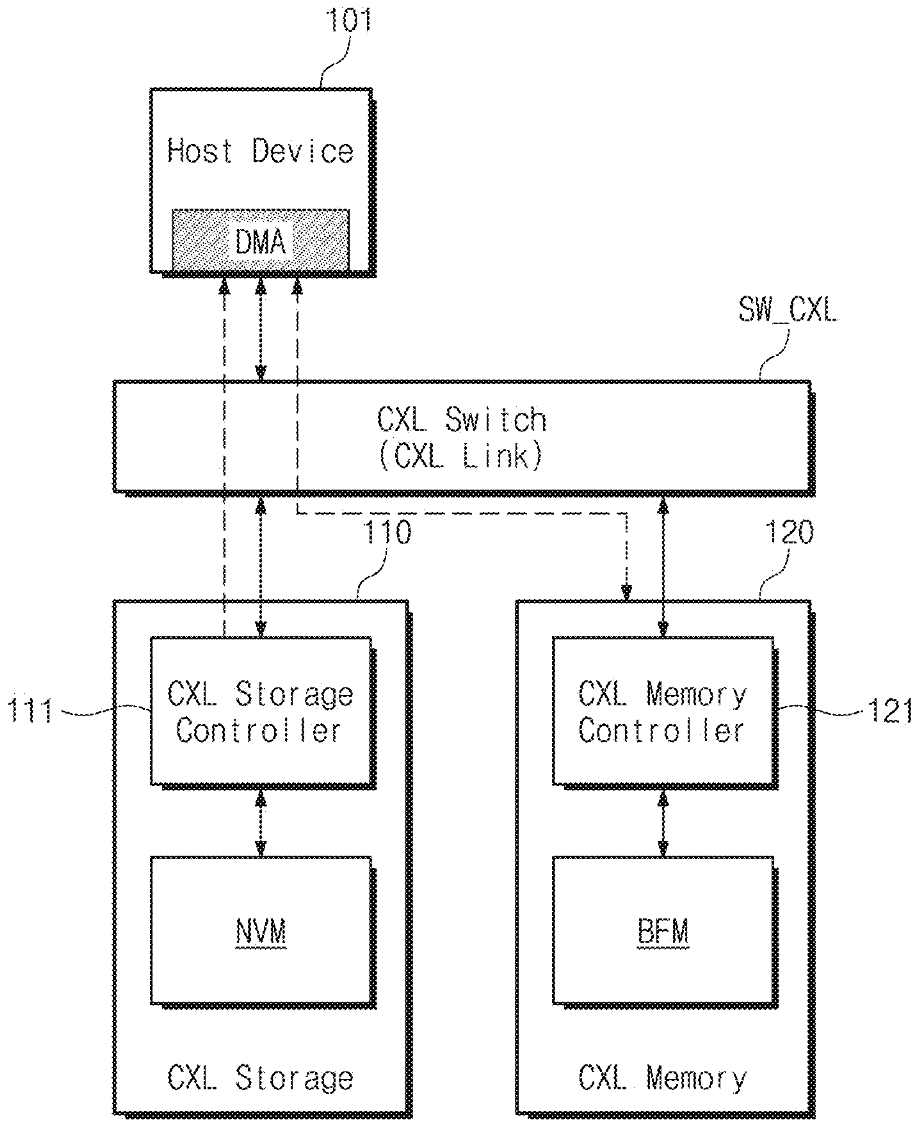

FIGS. 6 and 7 are diagrams describing an operation in which map data are stored in a CXL memory. In an embodiment, the map data MD present in the CXL storage 110 may be transferred and stored to the CXL memory 120 from the CXL storage 110 through various manners.

As an example, the CXL storage 110 and the CXL memory 120 may exchange the map data MD based on a peer-to-peer (P2P) manner. For example, as illustrated in FIG. 6, the CXL storage controller 111 of the CXL storage 110 may include a direct memory access (DMA) engine. The DMA engine included in the CXL storage controller 111 may transfer the map data MD present in the nonvolatile memory NVM to the CXL memory 120 without the interference or control of the host 101. That is, the map data MD may be transferred from the CXL storage 110 to the CXL memory 120 based on the P2P manner.

As an example, under control of the host 101, the CXL storage 110 and the CXL memory 120 may exchange the map data MD based on the DMA manner. For example, as illustrated in FIG. 7, the host 101 may include a direct memory access (DMA) engine. The DMA engine of the host 101 may read the map data MD from the CXL storage 110 and may transfer the map data MD thus read to the CXL memory 120. In an embodiment, the DMA engine of the host 101 may read the map data MD from the CXL storage 110 based on the CXL.io and may transfer the map data MD to the CXL memory 120 based on the CXL.mem.

The above manners in which map data are transferred from the CXL storage 110 to the CXL memory 120 are provided as an example, and embodiments are not limited thereto. It may be understood that the transfer of map data from the CXL storage 110 to the CXL memory 120 is implemented in various manners using the CXL interface or the CXL switch. In an embodiment, the transfer (i.e., the backup or flush) of map data from the CXL memory 120 to the CXL storage 110 may also be implemented in a manner(s) similar to the above manners.

Figure 8:
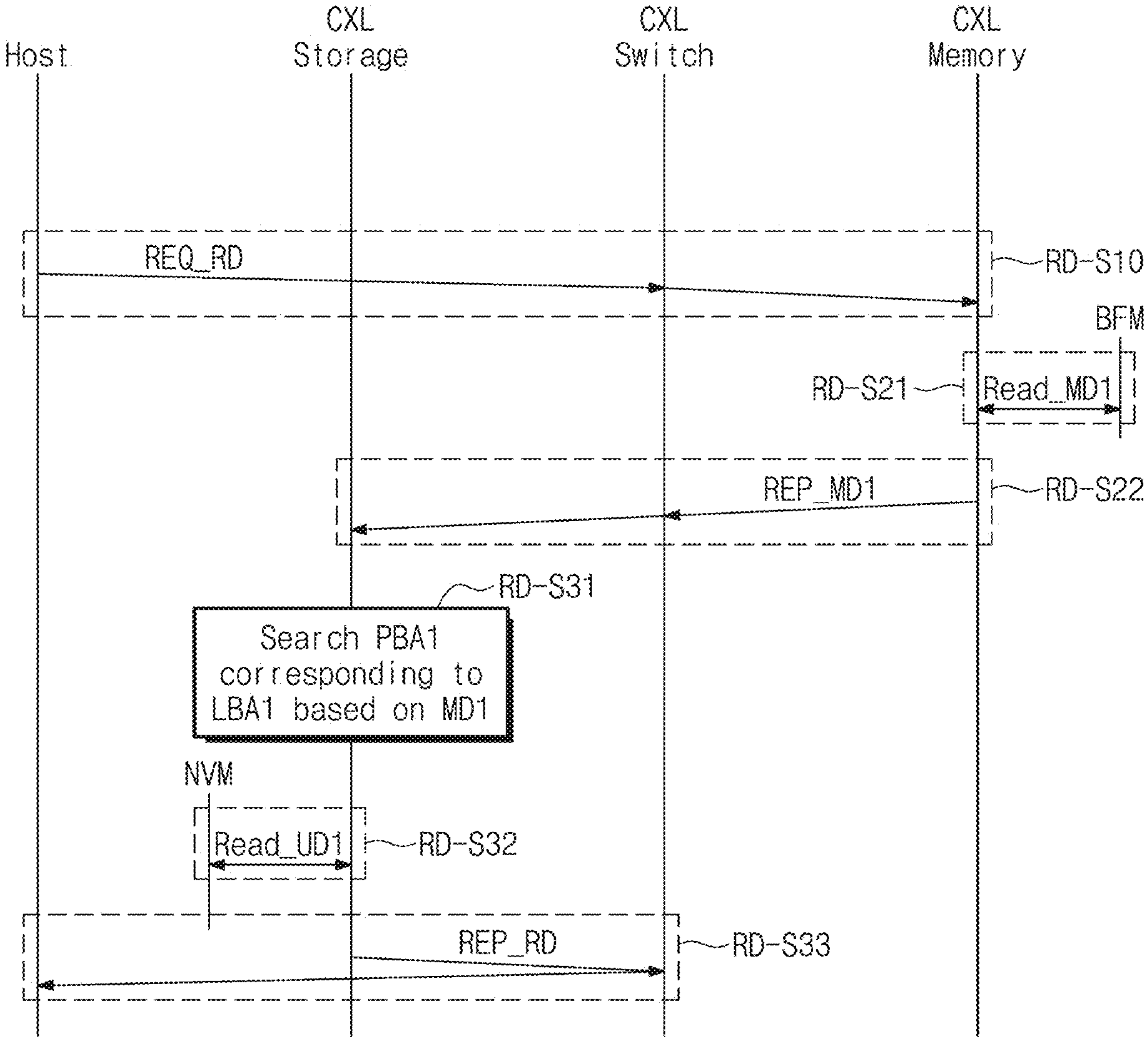
FIG. 8 is a flowchart illustrating a read operation for a CXL storage according to an embodiment.

FIG. 8 is a flowchart illustrating a read operation for CXL storage of FIG. 2. In an embodiment, the CXL memory 120 may manage user data distributed into the CXL storage 110 and any other CXL storage, the read operation for the CXL storage 110 according to the flowchart of FIG. 8 may be performed after the initialization operation of FIG. 4 is performed (i.e., after the map data MD of the CXL storage 110 are stored in the dedicated area of the CXL memory 120).

Referring to FIGS. 2, 3, and 8, in operation RD-S10, the host 101 may output a read request REQ_RD through the CXL host interface circuit 101*a*. The CXL switch SW_CXL may transfer the read request REQ_RD to the CXL memory 120 targeted for the read request REQ_RD. In an embodiment, read request REQ_RD may refer to a request for reading first user data UD1 stored in the CXL storage 110 among multiple CXL storages or copy user data of any other CXL storage and may include a first logical block address LBA1 corresponding to the first user data UD1.

When the read request REQ_RD is received, in operation RD-S21, the CXL memory 120 may read first map data MD1 based on telemetry information and a result of analyzing a plurality of map data. In an embodiment, the CXL memory controller 121 may read the first map data MD1 from the buffer memory BFM by using the buffer memory interface circuit 121*d*.

In an embodiment, the first map data MD1 read in operation RD-S21 may be a portion of the entire map data MD and may be map data corresponding to the first logical block address LBA1. That is, the first map data MD1 may include information about a first physical block address PBA1 corresponding to the first logical block address LBA1.

In operation RD-S22, the CXL memory 120 may output a response REP_MD1 including the first map data MD1 through the CXL memory interface circuit 121*a*. The CXL switch SW_CXL may transfer the response REP_MD1 to the CXL storage 110. In an embodiment, the first map data MD1 included in the response REP_MD1 received through the CXL switch SW_CXL may be stored or temporarily stored in the RAM 111*c* of the CXL storage controller 111.

In operation RD-S31, the CXL storage 110 may search for the first physical block address PBA1 corresponding the first logical block address LBA1 based on the first map data MD1. For example, the FTL 111*d* of the CXL storage controller 111 may search for the first physical block address PBA1 corresponding to the first logical block address LBA1 based on the first map data MD1.

In operation RD-S32, the CXL storage 110 may read the first user data UD1 present in an area corresponding to the first physical block address PBA1 from the nonvolatile memory NVM. For example, the CXL storage controller 111 may read the first user data UD1 from the area of the nonvolatile memory NVM, which corresponds to the first physical block address PBA1. In an embodiment, the CXL storage controller 111 may read the first user data UD1 from the nonvolatile memory NVM by using the NAND interface circuit 111*f*.

In operation RD-S33, the CXL storage 110 may output a read response REP_RD to the read request REQ_RD through the CXL storage interface circuit 111*a*. The CXL switch SW_CXL may transfer the read response REP_RD to the host 101. In an embodiment, the read response REP_RD may include the first user data UD1 requested through the read request REQ_RD. The host 101 may obtain the first user data UD1 through the read response REP_RD.

Figure 9:
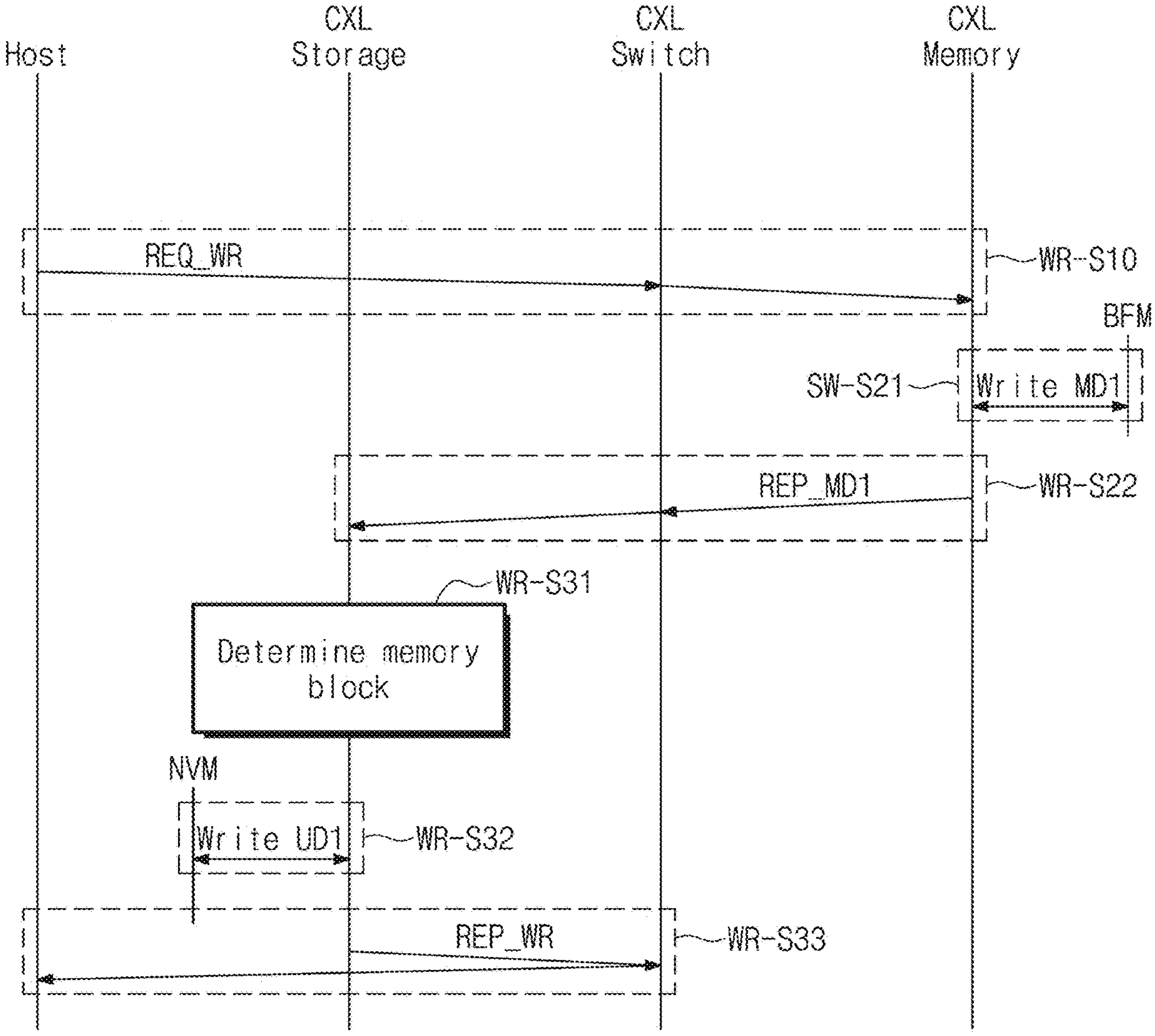
FIG. 9 is a flowchart illustrating a write operation for a CXL storage according to an embodiment.

FIG. 9 is a flowchart illustrating a write operation for CXL storage of FIG. 2. In an embodiment, the CXL memory 120 may manage user data distributed into the CXL storage 110 and any other CXL storage, the write operation for the CXL storage 110 according to the flowchart of FIG. 9 may be performed after the initialization operation of FIG. 4 is performed (i.e., after the map data MD of the CXL storage 110 are stored in the dedicated area of the CXL memory 120).

Referring to FIGS. 2, 3, and 9, in operation WR-S10, the host 101 may output a write request REQ_WR through the CXL host interface circuit 101*a*. The CXL switch SW_CXL may transfer the write request REQ_WR to the CXL memory 120. In an embodiment, the write request REQ_WR may refer to a request for writing the first user data UD1 in the CXL storage 110 or any other CXL storage.

When the write request REQ_WR is received, in operation WR-S21, the CXL memory 120 may select the CXL storage 110 among a plurality of CXL storages based on telemetry information and a result of analyzing a plurality of map data. The CXL memory 120 may stores the first map data MD1 corresponding to the selected CXL storage 110 in the buffer memory BFM.

In operation WR-S22, the CXL memory 120 may output the response REP_MD1 including the first map data MD1 through the CXL memory interface circuit 121*a*.

In operation WR-S31, the CXL storage 110 may determine a memory block in which the first user data UD1 are to be written, according to the first map data MD1 included in the response REP_MD1. For example, the FTL 111*d* of the CXL storage controller 111 may manage block information about a memory block, which is free, capable of being written to, or capable of being allocated, from among memory blocks included in the nonvolatile memory NVM. The FTL 111*d* may select a memory block, in which the first user data UD1 are to be written, based on the block information.

In operation WR-S32, the CXL storage 110 may write the first user data UD1 in the selected memory block. For example, the CXL storage controller 111 may control the nonvolatile memory NVM such that the first user data UD1 are written in the memory block selected according to the first map data MD1. In an embodiment, the CXL storage controller 111 may write the first user data UD1 in the nonvolatile memory NVM by using the NAND interface circuit 111*f*.

In operation WR-S33, the CXL storage 110 may output a write response REP_WR to the write request REQ_WR through the CXL storage interface circuit 111*a*. The CXL switch SW_CXL may transfer the write response REP_WR to the host 101. In response to the write response REP_WR, the host 101 may determine that the first user data UD1 corresponding to the write request REQ_WR are normally stored in the CXL storage 110.

Figure 10:
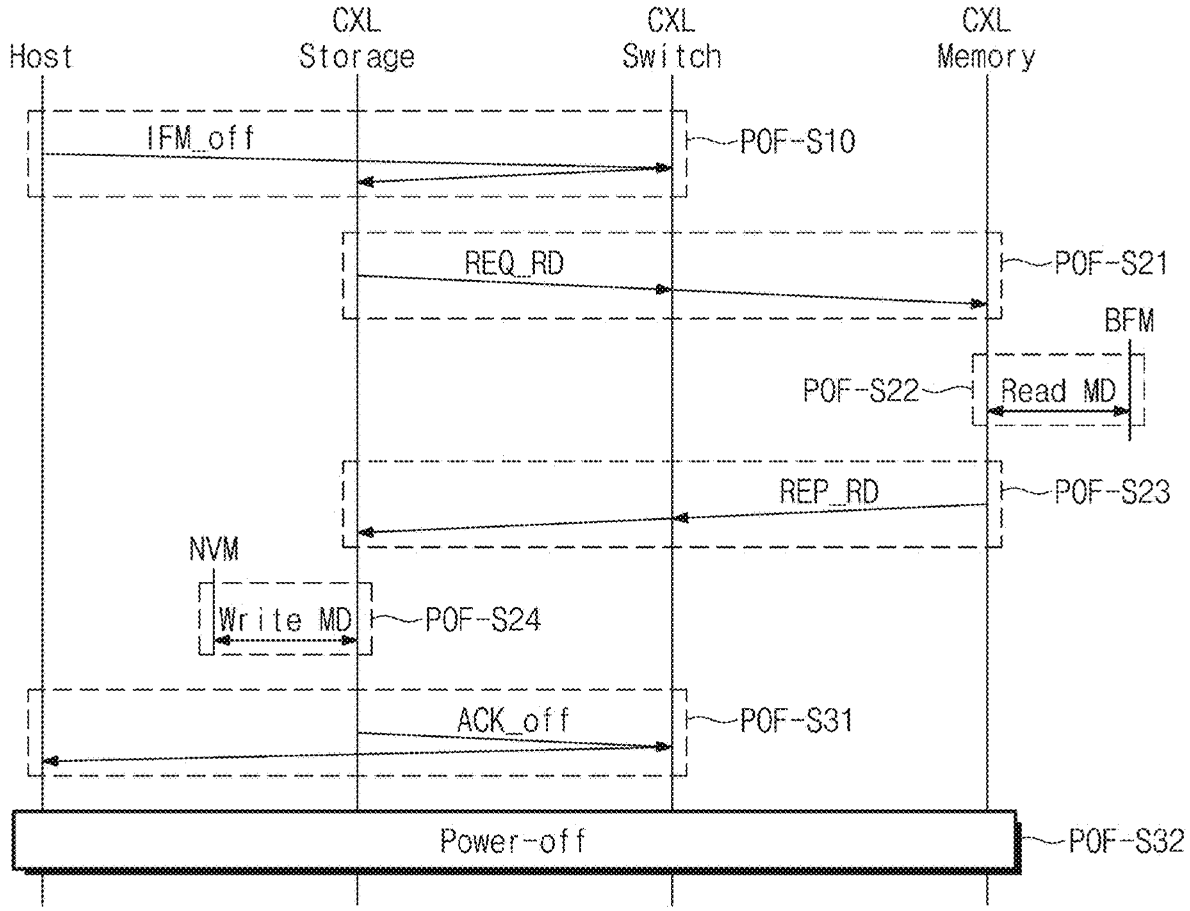
FIG. 10 is a flowchart illustrating a power-off operation of a computing system according to an embodiment.

FIG. 10 is a flowchart illustrating a power-off operation of a computing system of FIG. 2. In an embodiment, a power-off operation of a computing system will be described with reference to FIG. 10, but embodiments are not limited thereto. For example, it may be understood that the method of FIG. 10 is applicable to the power-off operation or reset operation of each of various components (e.g., a host, CXL storage, a CXL memory, and a CXL switch) included in the computing system.

Referring to FIGS. 2 and 10, in operation POF-S10, the host 101 may output power-off information IFM_off through the CXL host interface circuit 101*a*. The CXL switch SW_CXL may transfer the power-off information IFM_off to the CXL storage 110. For example, the host 101 may recognize or detect information about power-off of the computing system 100. The host 101 may send the power-off information IFM_off to the CXL storage 110 through the CXL switch SW_CXL such that the CXL storage 110 performs a power-off operation.

In operation POF-S21, the CXL storage 110 may output a read request REQ_RD through the CXL storage interface circuit 111*a* in response to the power-off information IFM_off. The CXL switch SW_CXL may transfer the read request REQ_RD to the CXL memory 120. In an embodiment, the read request REQ_RD in operation POF-S21 may refer to a request for reading the entire map data MD stored in the CXL memory 120. The read request REQ_RD may include a memory address of an area where the map data MD are stored.

In operation POF-S22, the CXL memory 120 may read the map data MD in response to the read request REQ_RD. For example, the CXL memory 120 may read the map data MD from the buffer memory BFM based on the memory address included in the read request REQ_RD.

In operation POF-S23, the CXL memory 120 may output a read response REP_RD to the read request REQ_RD through the CXL memory interface circuit 121*a*. The CXL switch SW_CXL may transfer the read response REP_RD to the CXL storage 110.

In operation POF-S24, the CXL storage 110 may write the map data MD included in the read response REP_RD in the nonvolatile memory NVM. In an embodiment, the CXL storage 110 may store the map data MD of a given area of the nonvolatile memory NVM.

After the entire map data MD associated with the CXL storage 110 are stored in the nonvolatile memory NVM, in operation POF-S31, the CXL storage 110 may output a response ACK_off to the power-off information IFM_off. The CXL switch SW_CXL may send the response ACK_off to the host 101. The host 101 may recognize that the map data MD present in the CXL memory 120 are normally stored in the CXL storage 110, based on the response ACK_off.

Afterwards, in operation POF-S32, the host 101, the CXL storage 110, the CXL memory 120, and the CXL switch SW_CXL may be powered off. For example, a power that is provided to the host 101, the CXL storage 110, the CXL memory 120, and the CXL switch SW_CXL may be interrupted.

In an embodiment, the CXL memory 120 may manage user data distributed into the CXL storage 110 and any other CXL storage and may actively manage the power-off operation of the computing system 100. For example, unlike the example illustrated in FIG. 10, in operation POF-S10, the host 101 may provide the CXL memory 120 with the power-off information IFM_off through the CXL switch SW_CXL. Operation POF-S21 may be omitted.

The power-off operation described with reference to FIG. 10 is provided as an example, and embodiments are not limited thereto. For example, after the CXL storage 110 stores the map data MD present in the CXL memory 120 in the nonvolatile memory NVM, the CXL storage 110 may provide notification that the map data MD are completely backed up, by sending acknowledge ACK_off to the host 101 (i.e., an interrupt manner). Alternatively, the CXL storage 110 may set a value of a specific register to a given value after storing the map data MD present in the CXL memory 120 in the nonvolatile memory NVM. The host 101 may check whether the map data MD are completely backed up, by periodically checking the value of the specific register of the CXL storage 110 (a polling manner). Alternatively, the CXL storage 110 may be configured to complete a backup operation for the map data MD within a given time from a point in time when the power-off information IFM_off is received from the host 101 (a time-out manner). As described above, the CXL storage 110 may send information about backup completion of the map data MD to the host 101 through at least one of various manners.

In an embodiment, the power-off operation may be changed according to an operation manner of the CXL storage 110. For example, when the CXL storage 110 performs the write operation, the CXL storage 110 may perform the program operation on the nonvolatile memory NVM and thus may update the map data MD.

In an embodiment, the operation of updating the map data MD may be performed only on the CXL memory 120. In this case, the map data MD stored in the CXL memory 120 may be up-to-date information, and the map data MD stored in the nonvolatile memory NVM may not be up-to-date information. That is, when the operation of updating the map data MD is performed only on the CXL memory 120, up-to-date information about the map data MD is maintained only in the CXL memory 120, for this reason, when the CXL storage 110, the CXL memory 120, or the computing system 100 is powered off, an operation of flushing, backing up, or dumping the map data MD from the CXL memory 120 is required.

In an embodiment, the map data (MD) update operation may be first performed with respect to the map data MD stored in the nonvolatile memory NVM and may then be performed with respect to the map data MD stored in the CXL memory 120 through the background operation. In this case, because the map data MD stored in the nonvolatile memory NVM are guaranteed to be up-to-date information, the operation of flushing, dumping, or backing up the map data MD from the CXL memory 120 may not be required when the CXL storage 110, the CXL memory 120, or the computing system 100 is powered off.

In an embodiment, the map data update operation may be first performed with respect to the map data MD stored in the CXL memory 120 and may then be performed with respect to the map data MD stored in the nonvolatile memory NVM through the background operation. In this case, the map data MD stored in the CXL memory 120 may be up-to-date information, and the map data MD stored in the nonvolatile memory NVM may not be up-to-date information. As such, when the CXL storage 110, the CXL memory 120, or the computing system 100 is powered off, at least a portion of the map data MD of the CXL memory 120 has to be backed up to the nonvolatile memory NVM of the CXL storage 110. In an embodiment, at least a portion of the map data MD to be backed up to the nonvolatile memory NVM may be the up-to-date map data MD that are not stored in the nonvolatile memory NVM. In an embodiment, the CXL storage 110 may manage or store flag information or table information indicating that the map data MD stored in the nonvolatile memory NVM are up-to-date information.

As described above, when the CXL storage 110, the CXL memory 120, or the computing system 100 is powered off, depending on a way to manage the map data MD (i.e., depending on a place where up-to-date information is managed), the map data MD may be selectively flushed, backed up, or dumped to the CXL storage 110 from the CXL memory 120.

Figure 11:
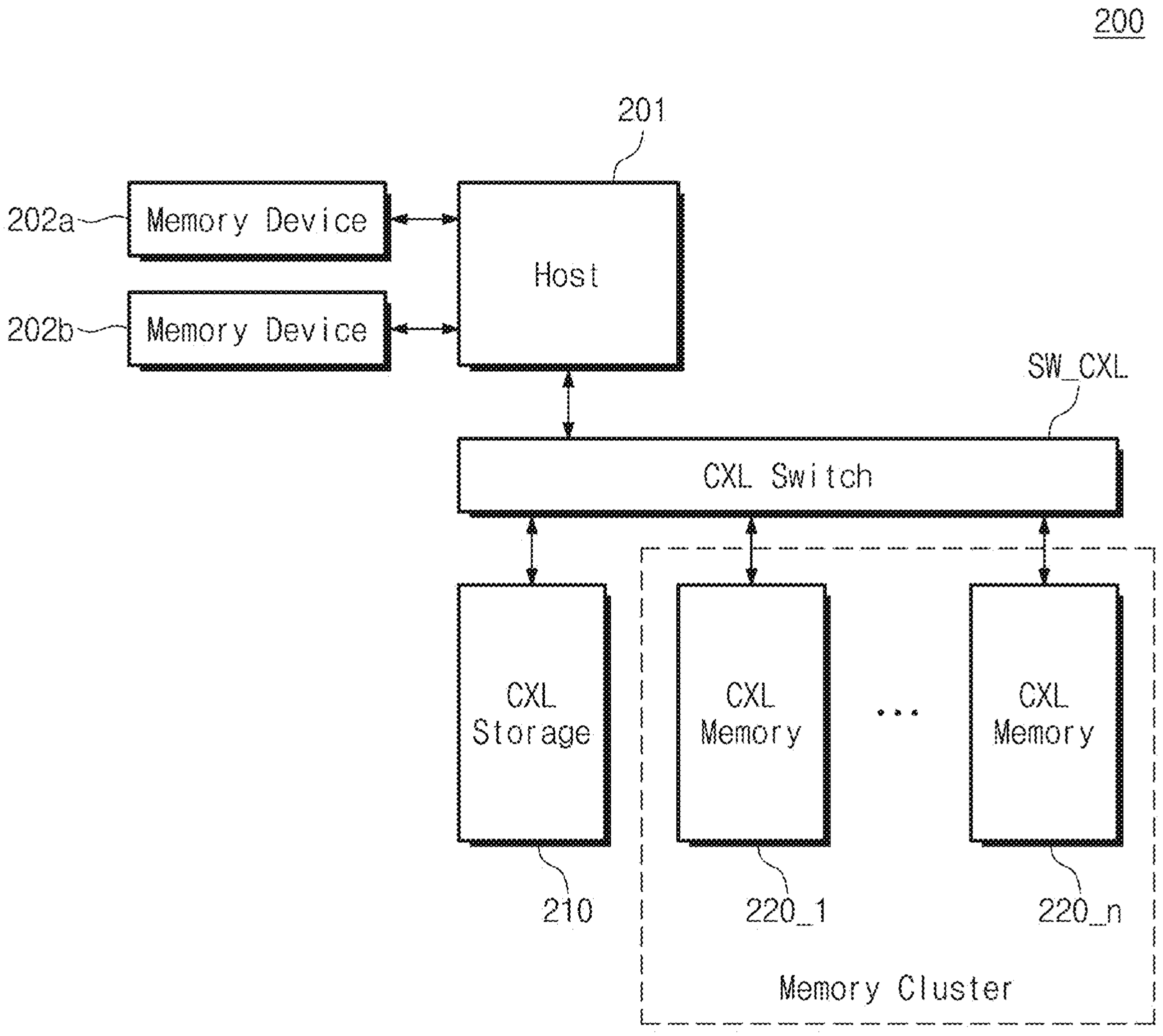
FIG. 11 is a block diagram of a computing system according to an embodiment.

FIG. 11 is a block diagram of a computing system according to an embodiment. Below, for convenience of description, additional description associated with the components described above will be omitted to avoid redundancy. Referring to FIG. 11, a computing system 200 may include a host 201, a plurality of memory devices 202*a* and 202*b*, the CXL switch SW_CXL, CXL storage 210, and a plurality of CXL memories 220_1 to 220_*n*.

The host 201 may be directly connected with the plurality of memory devices 202*a* and 202*b*. The host 201, the CXL storage 210, and the plurality of CXL memories 220_1 to 220_*n* may be connected with the CXL switch SW_CXL and may communicate with each other through the CXL switch SW_CXL.

In an embodiment, the CXL storage 210 may have a structure similar to that of the CXL storage 110 described with reference to FIGS. 2 to 10, and each of the plurality of CXL memories 220_1 to 220_*n* may have a structure similar to that of the CXL memory 120 described with reference to FIGS. 2 to 10. That is, each of the plurality of CXL memories 220_1 to 220_*n* may be implemented with an individual memory device or memory module and may be connected with the CXL switch SW_CXL through different physical ports. That is, as the plurality of CXL memories 220_1 to 220_*n* are connected with the CXL switch SW_CXL, a memory area (or capacity) that is managed by the host 201 may increase.

In an embodiment, the host 201 may manage the plurality of CXL memories 220_1 to 220_*n* as one memory cluster. In an embodiment, the host 201 may allocate at least some of the plurality of CXL memories 220_1 to 220_*n* for a memory dedicated for the CXL storage 210. Alternatively, the host 201 may allocate at least a partial area of each of the plurality of CXL memories 220_1 to 220_*n* for a memory dedicated for the CXL storage 210.

Figure 12:
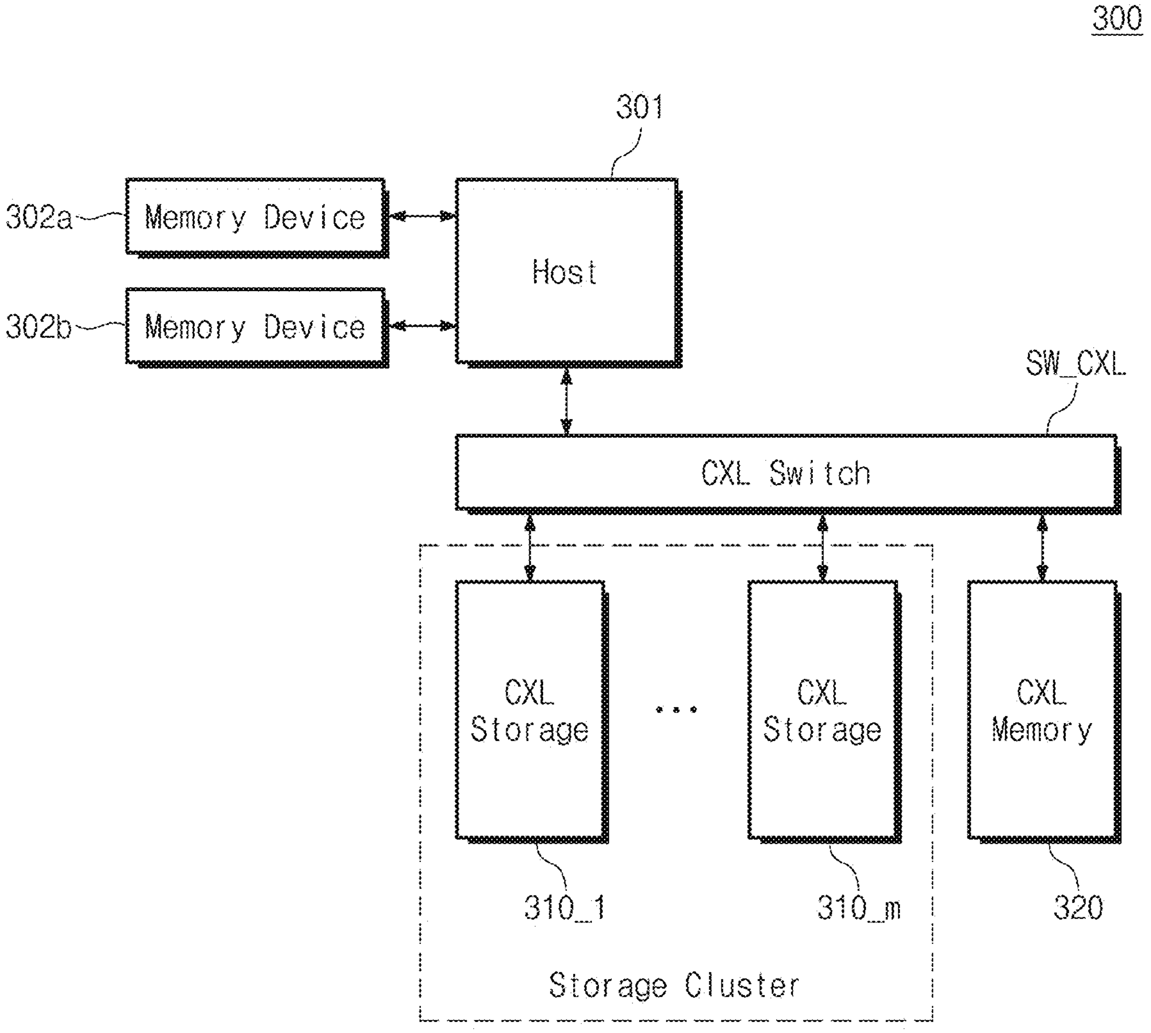
FIG. 12 is a block diagram of a computing system according to an embodiment.

FIG. 12 is a block diagram of a computing system according to an embodiment. Below, for convenience of description, additional description associated with the components described above will be omitted to avoid redundancy. Referring to FIG. 12, a computing system 300 may include a host 301, a plurality of memory devices 302*a* and 302*b*, the CXL switch SW_CXL, a plurality of CXL storages 310_1 to 310_*m*, and a CXL memory 320.

The host 301 may be directly connected with the plurality of memory devices 302*a* and 302*b*. The host 301, the plurality of CXL storages 3101 to 310_*m*, and the CXL memory 320 may be connected with the CXL switch SW_CXL and may communicate with each other through the CXL switch SW_CXL.

In an embodiment, each of the plurality of CXL storages 310_1 to 310_*m* may have a structure similar to that of the CXL storage 110 described with reference to FIGS. 2 to 10, and the CXL memory 320 may have a structure similar to that of the CXL memory 120 described with reference to FIGS. 2 to 10. That is, each of the plurality of CXL storages 310_1 to 310_*m* may be implemented with an individual storage device or storage module and may be connected with the CXL switch SW_CXL through different physical ports. That is, as the plurality of CXL storages 310_1 to 310_*m* are connected with the CXL switch SW_CXL, a storage area (or capacity) that is available by the host 301 may increase.

In an embodiment, at least a partial area of the CXL memory 320 may be allocated for an area dedicated for the plurality of CXL storages 310_1 to 310_*m*. For example, the host 301 may manage the plurality of CXL storages 310_1 to 310_*m* as one storage cluster and may allocate a partial area of the CXL memory 320 for a dedicated area of one storage cluster. Alternatively, the host 301 may allocate partial areas of the CXL memory 320 for dedicated areas of the respective CXL storages 310_1 to 310_*m*.

Figure 13:
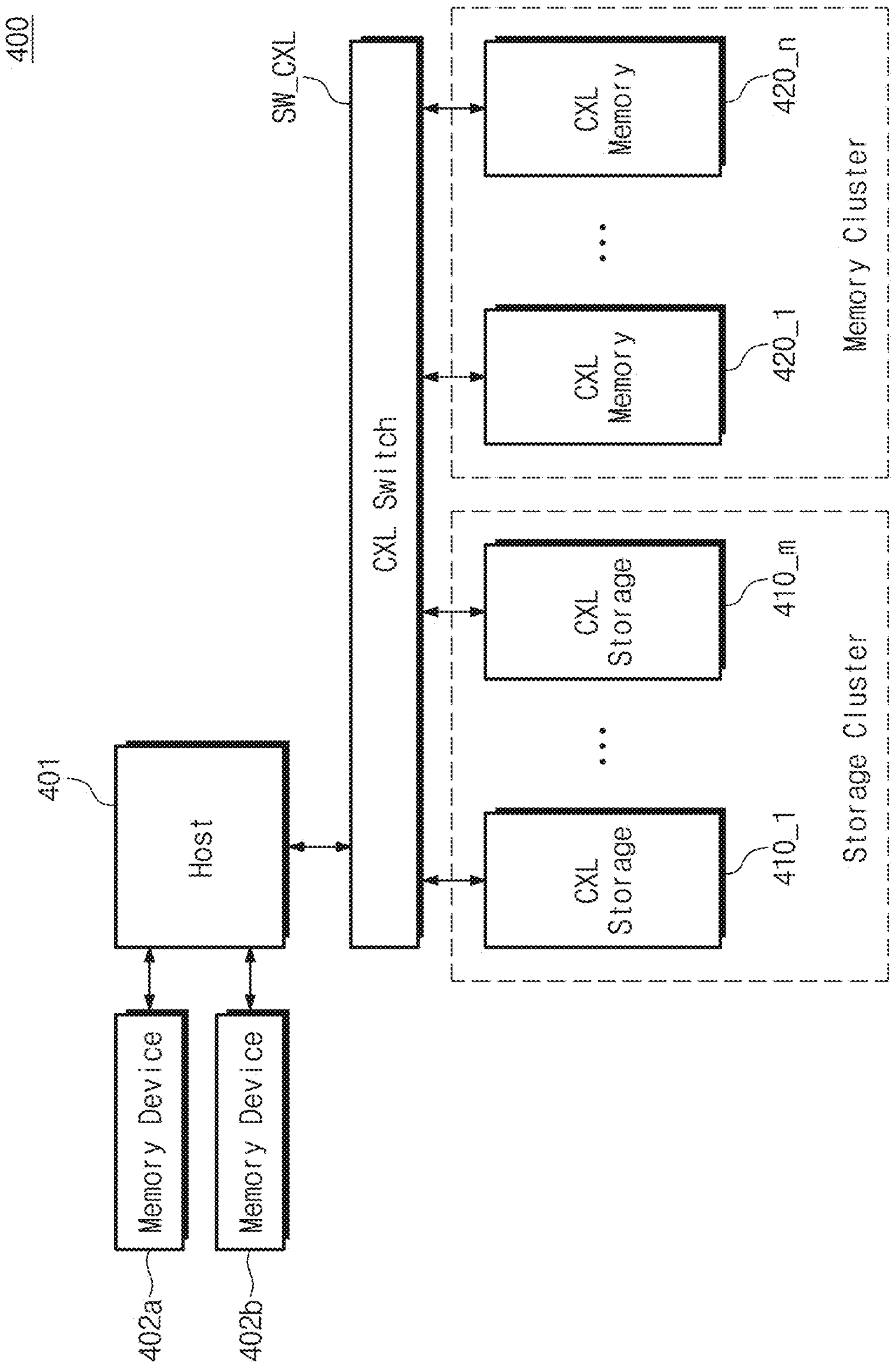
FIG. 13 is a block diagram of a computing system according to an embodiment.

FIG. 13 is a block diagram of a computing system according to an embodiment. Below, for convenience of description, additional description associated with the components described above will be omitted to avoid redundancy. Referring to FIG. 13, a computing system 400 may include a host 401, a plurality of memory devices 402*a* and 402*b*, the CXL switch SW_CXL, a plurality of CXL storages 410_1 to 410_*m*, and a plurality of CXL memories 420_1 to 420_*n*.

The host 401 may be directly connected with the plurality of memory devices 402*a* and 402*b*. The host 401, the plurality of CXL storages 410_1 to 410_*m*, and the plurality of CXL memories 420_1 to 420_*n* may be connected with the CXL switch SW_CXL and may communicate with each other through the CXL switch SW_CXL.

In an embodiment, each of the plurality of CXL storages 410_1 to 410_*m* may have a structure similar to that of the CXL storage 110 described with reference to FIGS. 2 to 10, and each of the plurality of CXL memories 420_1 to 420_*n* may have a structure similar to that of the CXL memory 120 described with reference to FIGS. 2 to 10. The host 401 may manage the plurality of CXL storages 410_1 to 410_*m* as one storage cluster, and may mange the plurality of CXL memories 420_1 to 420_*n* as one memory cluster. The host 401 may allocate a partial area of the memory cluster for a dedicated area (i.e., an area for storing map data of the storage cluster) of the storage cluster. Alternatively, the host 401 may allocate areas of the CXL memories 420_1 to 420_*n* for dedicated areas of the respective CXL storages 410_1 to 410_*m*.

Figure 14:
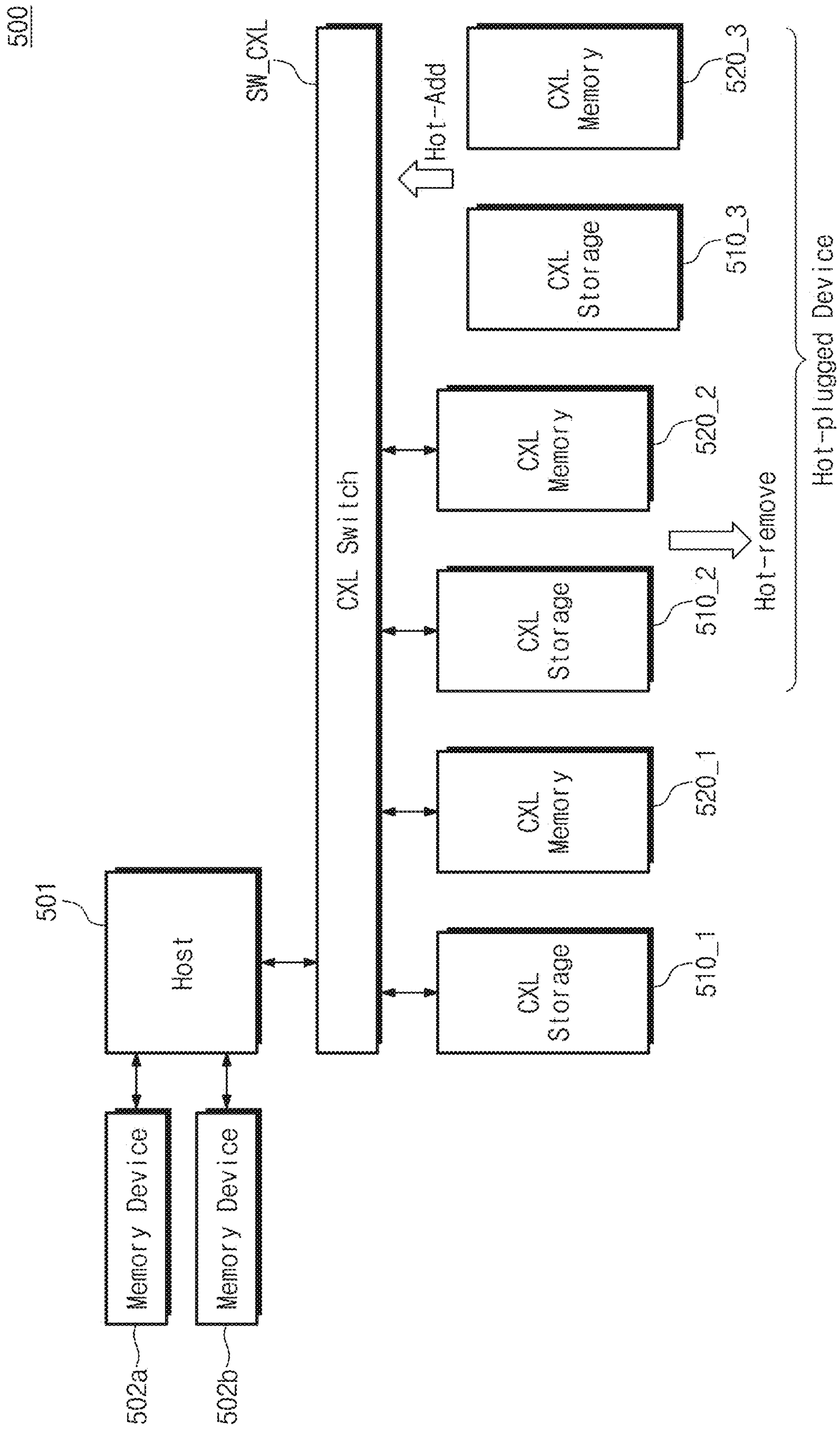
FIG. 14 is a block diagram of a computing system according to an embodiment.

FIG. 14 is a block diagram of a computing system according to an embodiment. Below, for convenience of description, additional description associated with the components described above will be omitted to avoid redundancy. Referring to FIG. 14, a computing system 500 may include a host 501, a plurality of memory devices 502*a* and 502*b*, the CXL switch SW_CXL, a plurality of CXL storages 510_1, 510_2, and 510_3, and a plurality of CXL memories 520_1, 520_2, and 502_3.

The host 501 may be directly connected with the plurality of memory devices 502*a* and 502*b*. The host 501, the plurality of CXL storages 510_1 and 510_2, and the plurality of CXL memories 520_1 and 520_2 may be connected with the CXL switch SW_CXL and may communicate with each other through the CXL switch SW_CXL. As in the above description, a partial area of the CXL memories 520_1 and 520_2 may be allocated for a dedicated area of the CXL storages 510_1 and 510_2.

In an embodiment, each of the plurality of CXL storages 510_1, 510_2 and 510_3 may have a structure similar to that of the CXL storage 110 described with reference to FIGS. 2 to 10, and each of the plurality of CXL memories 520_1, 520_2 and 520_3 may have a structure similar to that of the CXL memory 120 described with reference to FIGS. 2 to 10. While the computing system 500 is being driven, some of the CXL storages 510_1 and 510_2 or some of the CXL memories 520_1 and 520_2 may be hot-removed from the CXL switch SW_CXL. Alternatively, while the computing system 500 is being driven, the CXL storage 510_3 or the CXL memory 520_3 may be hot-added to the CXL switch SW_CXL. In this case, the host 501 may again perform memory allocation by again performing the initialization operation on devices connected with the CXL switch SW_CXL through the reset operation or the hot-plug operation. That is, CXL storage and a CXL memory according to an embodiment may support the hot-plug function and may make it possible to expand a storage capacity and a memory capacity of a computing system through various connections.

Figure 15:
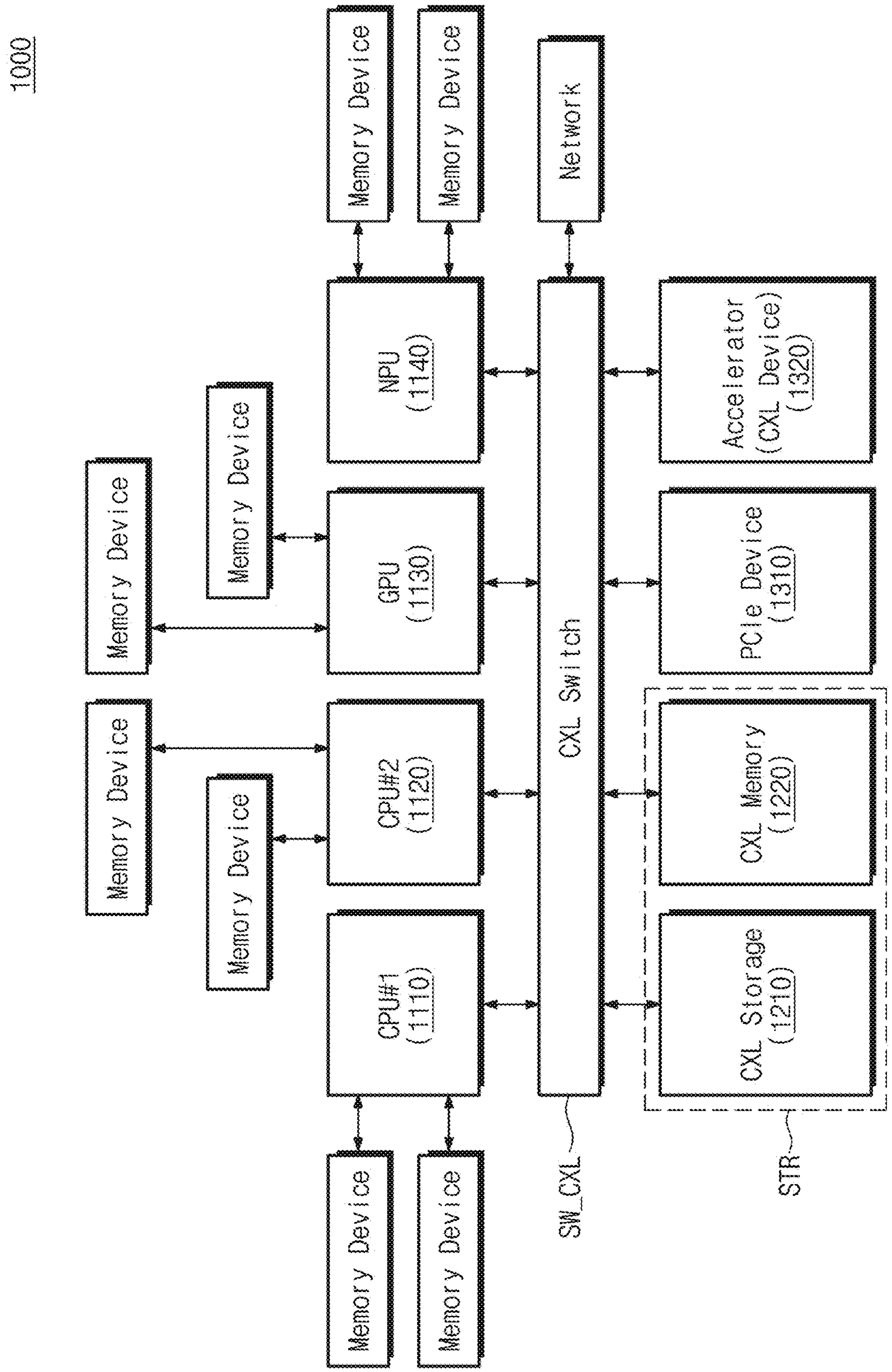
FIG. 15 is a block diagram of a computing system according to an embodiment.

FIG. 15 is a block diagram of a computing system according to an embodiment. For convenience of description, additional description associated with the components described above will be omitted to avoid redundancy. Referring to FIG. 15, a computing system 1000 may include a first CPU 1110, a second CPU 1120, a GPU 1130, an NPU 1140, the CXL switch SW_CXL, CXL storage 1210, a CXL memory 1220, a PCIe device 1310, and an accelerator (CXL device) 1320.

The first CPU 1110, the second CPU 1120, the GPU 1130, the NPU 1140, the CXL storage 1210, the CXL memory 1220, the PCIe device 1310, and the accelerator (CXL device) 1320 may be connected in common with the CXL switch SW_CXL and may communicate with each other through the CXL switch SW_CXL.

In an embodiment, each of the first CPU 1110, the second CPU 1120, the GPU 1130, and the NPU 1140 may be the host described with reference to FIGS. 1 to 14 and may be directly connected with individual memory devices.

In an embodiment, the CXL storage 1210 and the CXL memory 1220 may be the CXL storage and the CXL memory described with reference to FIGS. 2 to 14, and at least a partial area of the CXL memory 1220 may be allocated for an area dedicated for the CXL storage 1210 by one or more of the first CPU 1110, the second CPU 1120, the GPU 1130, and the NPU 1140. That is, the CXL storage 1210 and the CXL memory 1220 may be used as a storage space STR of the computing system 1000.

In an embodiment, the CXL switch SW_CXL may be connected with the PCIe device 1310 or the accelerator 1320 configured to support various functions, and the PCIe device 1310 or the accelerator 1320 may communicate with each of the first CPU 1110, the second CPU 1120, the GPU 1130, and the NPU 1140 through the CXL switch SW_CXL or may access the storage space STR including the CXL storage 1210 and the CXL memory 1220 through the CXL switch SW_CXL.

In an embodiment, the CXL switch SW_CXL may be connected with an external network or Fabric and may be configured to communicate with an external server through the external network or Fabric.

Figure 16:
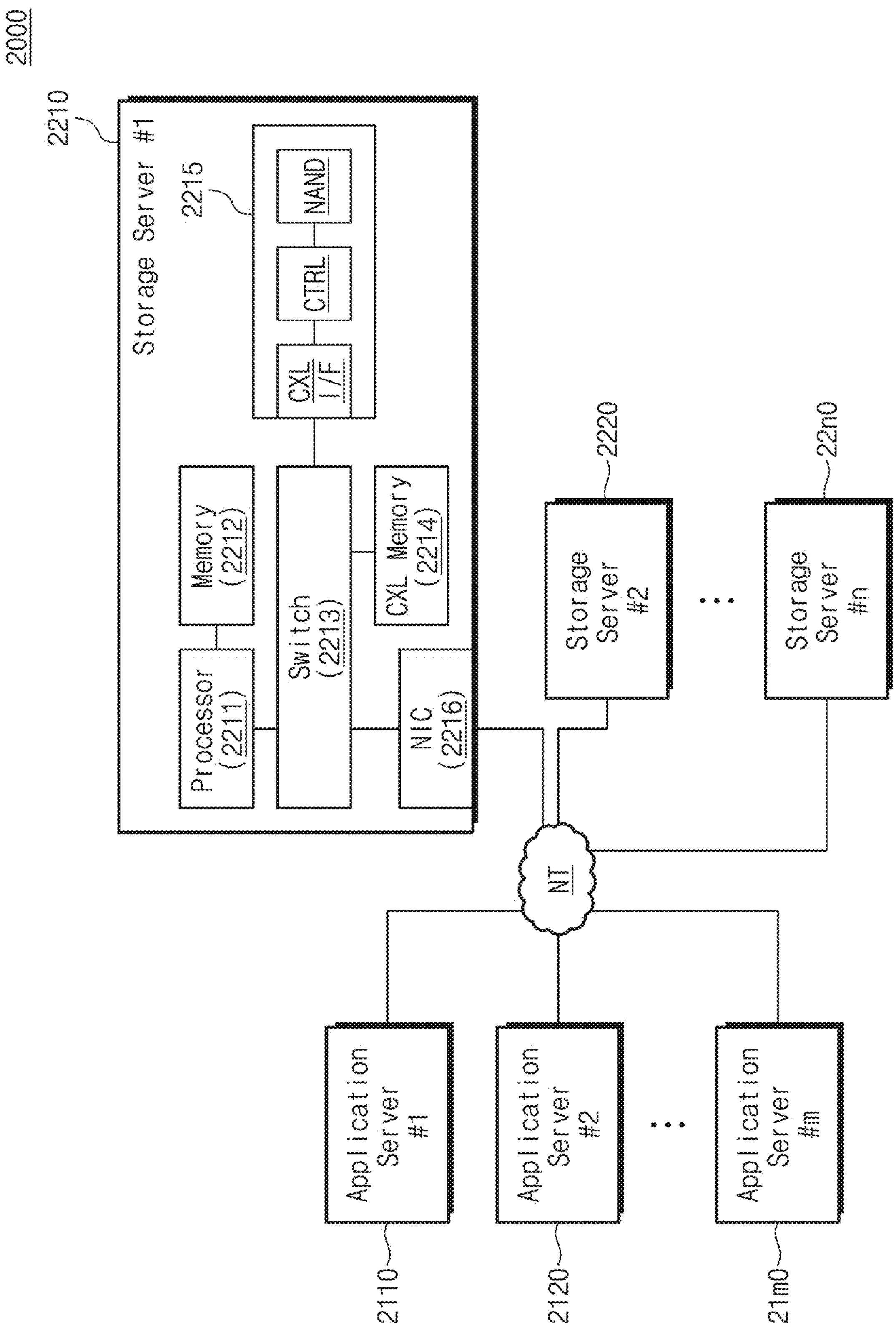
FIG. 16 is a block diagram illustrating a data center to which a computing system according to an embodiment.

FIG. 16 is a block diagram illustrating a data center according to an embodiment. Referring to FIG. 16, a data center 2000 that is a facility collecting various data and providing services may be referred to as a "data storage center". The data center 2000 may be a system for operating a search engine and a database, and may be a computing system used in a business such as a bank or in a government institution. The data center 2000 may include application servers 2110 to **21*m*0 and storage servers 2210 to 22*n*0**. The number of application servers and the number of storage servers may be variously selected according to an embodiment, and the number of application servers and the number of storage servers may be different from each other.

Below, a configuration of the first storage server 2210 will be mainly described. The application servers 2110 to **21*m*0 may have similar structures, the storage servers 2210 to 22*n*0 may have similar structures, and the application servers 2110 to 21*m*0 and the storage servers 2210 to 22*n*0** may communicate with each other over a network NT.

The first storage server 2210 may include a processor 2211, a memory 2212, a switch 2213, a storage device 2215, a CXL memory 2214, and a network interface card (NIC) 2216. The processor 2211 may control an overall operation of the first storage server 2210 and may access the memory 2212 to execute an instruction loaded onto the memory 2212 or to process data. The memory 2212 may be implemented with a Double Data Rate Synchronous DRAM (DDR SDRAM), a High Bandwidth Memory (HBM), a Hybrid Memory Cube (HMC), a Dual In-line Memory Module (DIMM), an Optane DIMM, and/or an Non-Volatile DIMM (NVMDIMM). The processor 2211 and the memory 2212 may be directly connected, and the numbers of processors and memories included in one storage server 2210 may be variously selected.

In an embodiment, the processor 2211 and the memory 2212 may provide a processor-memory pair. In an embodiment, the number of processors 2211 and the number of memories 2212 may be different from each other. The processor 2211 may include a single core processor or a multi-core processor. The detailed description of the storage server 2210 may be similarly applied to the application servers 2110 to **21*m*0**.

The switch 2213 may be configured to arbitrate or route the communications between various components included in the first storage server 2210. In an embodiment, the switch 2213 may be implemented with the CXL switch SW_CXL described with reference to FIGS. 1 to 15. That is, the switch 2213 may be a switch implemented based on the CXL protocol.

The CXL memory 2214 may be connected with the switch 2213. In an embodiment, the CXL memory 2214 may be used as a memory expander for the processor 2211. Alternatively, as described with reference to FIGS. 1 to 15, the CXL memory 2214 may be allocated for a dedicated memory or a buffer memory of the storage device 2215.

The storage device 2215 may include a CXL interface circuit CXL_IF, a controller CTRL, and a NAND flash NAND. According to a request of the processor 2211, the storage device 2215 may store data or may output the stored data. In an embodiment, the storage device 2215 may be implemented with the CXL storage described with reference to FIGS. 1 to 15. In an embodiment, as in the description given with reference to FIGS. 1 to 15, at least a partial area of the CXL memory 2214 may be allocated for a dedicated area, and the dedicated area may be used as a buffer memory (i.e., may be used to store map data in the CXL memory 2214).

According to an embodiment, the application servers 2110 to **21*m*0 may not include the storage device 2215. The storage server 2210 may include at least one or more storage devices 2215. The number of storage devices 2215 included in the storage server 2210** may be variously selected according to an embodiment.

The NIC 2216 may be connected with the CXL switch SW_CXL. The NIC 2216 may communicate with the remaining storage servers 2220 to **22*n*0 or the application servers 2210 to 21*m*0** over the network NT.

In an embodiment, the NIC 2216 may include a network interface card, a network adapter, etc. The NIC 2216 may be connected with the network NT by a wired interface, a wireless interface, a Bluetooth interface, an optical interface, etc. The NIC 2216 may include an internal memory, a digital signal processor (DSP), a host bus interface, etc. and may be connected with the processor 2211 and/or the switch 2213 through the host bus interface. In an embodiment, the NIC 2216 may be integrated with at least one of the processor 2211, the switch 2213, and the storage device 2215.

In an embodiment, the network NT may be implemented by using a Fibre channel (FC) or an Ethernet. In this case, the FC may be a medium that is used in high-speed data transmission and may use an optical switch that provides high performance/high availability. Storage servers may be provided as file storage, block storage, or object storage according to an access manner of the network NT.

In an embodiment, the network NT may be a storage-dedicated network such as a storage area network (SAN).

For example, the SAN may be a FC-SAN that uses a FC network and is implemented according to a FC protocol (FCP). For another example, the SAN may be an IP-SAN that uses a TCP/IP network and is implemented according to an iSCSI (SCSI over TCP/IP or Internet SCSI). In an embodiment, the network NT may be a legacy network such as a TCP/IP network. For example, the network NT may be implemented according to the following protocols: FCoE (FC over Ethernet), NAS (Network Attached Storage), or NVMe-oF (NVMe over Fabrics).

In an embodiment, at least one of the application servers 2110 to **21*m*0 may store data, which are store-requested by a user or a client, in one of the storage servers 2210 to 22*n*0 over the network NT. At least one of the application servers 2110 to 21*m*0 may obtain data, which are read-requested by the user or the client, from one of the storage servers 2210 to 22*n*0 over the network NT. For example, at least one of the application servers 2110 to 21*m*0** may be implemented with a web server, a database management system (DBMS), etc.

In an embodiment, at least one of the application servers 2210 to **21*m*0 may access a memory, a CXL memory, or a storage device included in any other application server over the network NT or may access memories, CXL memories, or storage devices included in the storage servers 2210 to 22*n*0 over the network NT. As such, at least one of the application servers 2110 to 21*m*0 may perform various operations on data stored in the remaining application servers and/or storage servers. For example, at least one of the application servers 2110 to 21*m*0** may execute an instruction for moving or copying data between the remaining application servers and/or storage servers. In this case, the data may be moved from storage devices of storage servers to memories or CXL memories of application servers through memories or CXL memories of the storage servers or directly. The data that are transferred over a network may be data that are encrypted for security or privacy.

In an embodiment, a CXL memory included in at least one of the application servers 2110 to **21*m*0 and the storage servers 2210 to 22*n*0 may be allocated for a dedicated area of a storage device included in at least one of the application servers 2110 to 21*m*0 and the storage servers 2210 to 22*n*0, and the storage device may use the dedicated area thus allocated as a buffer memory (i.e., may store map data in the dedicated area). For example, a CXL memory included in a storage server (e.g., 22*n*0) may be allocated to the storage device 2215 included in the storage server 2210, and the storage device 2215 included in the storage server 2210 may access the CXL memory included in the storage server (e.g., 22*n*0) over the switch 2213 and the NIC 2216. In this case, the map data associated with the storage device 2215 of the first storage server 2210 may be stored in the CXL memory of the storage server 22*n*0**. That is, storage devices and CXL memories of the data center may be connected and implemented in various manners.

Figure 17:
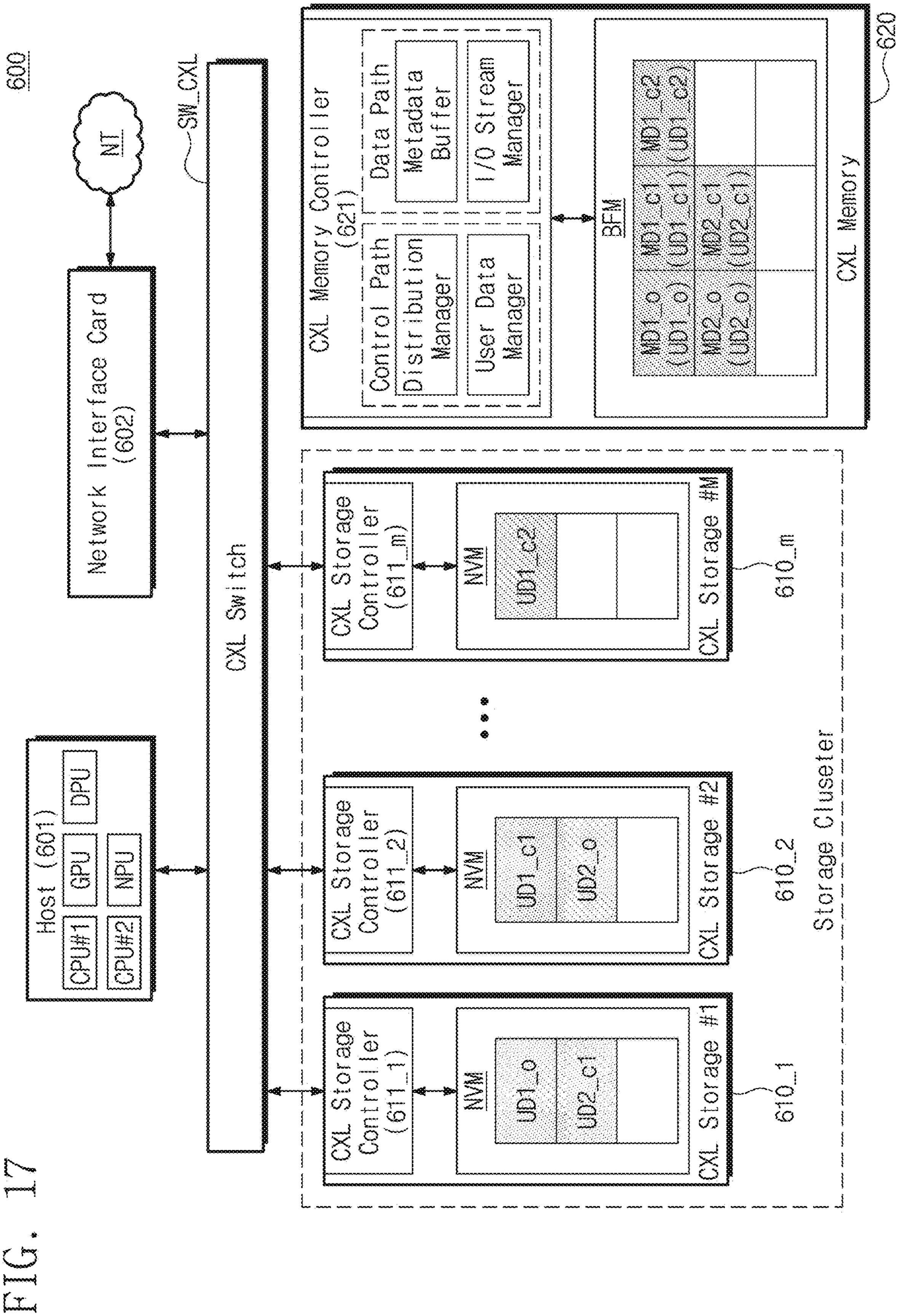
FIG. 17 is a block diagram of a computing system according to an embodiment.

FIG. 17 is a block diagram of a computing system according to an embodiment. Below, for convenience of description, additional description associated with the components described above will be omitted to avoid redundancy. Referring to FIG. 17, a computing system 600 may include a host 601, a network interface card 602, the CXL switch SW_CXL, a plurality of CXL storages 610_1 to **610_*m*, and a CXL memory 620**.

The host 601, the network interface card 602, the plurality of CXL storages 610_1 to **610_*m*, and the CXL memory 620 may be connected with the CXL switch SW_CXL and may communicate with each other through the CXL switch SW_CXL. That is, the CXL switch SW_CXL may provide an interface between the host 601, the network interface card 602, the plurality of CXL storages 610_1 to 610_*m*, and the CXL memory 620**.

The host 601 may include various processors such as a first CPU, a second CPU, a GPU, an NPU, and a DPU. The performance of the first CPU may be different from the performance of the second CPU. For example, one of the first CPU and the second CPU may be a high-performance core, and the other thereof may be a low-power core. The host 601 may refer to a device that includes heterogeneous processors.

In an embodiment, the host 601 may support a haddoop distributed file system (HDFS). The host 601 may use the CXL memory 620 as a namenode of the HDFS and may use the plurality of CXL storages 610_1 to **610_*m* as data nodes of the HDFS. For example, the CXL memory 620 may correspond to a master node of the HDFS, and the plurality of CXL storages 610_1 to 610_*m*** may correspond to slave nodes of the HDFS.

The network interface card 602 may communicate with other computing systems through the network NT, as well as the computing system 600. The network NT may be implemented with a FC or an Ethernet.

The plurality of CXL storages 610_1 to **610_*m* may be referred to as a "storage cluster" that is managed by the host 601. The plurality of CXL storages 610_1 to 610_*m* may be also referred to as "first to m-th CXL storages 610_1 to 610_*m***".

The first CXL storage 610_1 may include a CXL storage controller 611_1 and the nonvolatile memory NVM. The CXL storage controller 611_1 may store data in the nonvolatile memory NVM or may manage operations of reading the stored data. The second CXL storage 610_2 may include a CXL storage controller 611_2 and the nonvolatile memory NVM. As in the above description, the m-th CXL storage **610_*m* may include a CXL storage controller 611_*m*** and the nonvolatile memory NVM. Herein, "m" is an arbitrary natural number.

In an embodiment, the plurality of CXL storages 610_1 to **610_*m* may distribute and store user data. For example, the nonvolatile memory NVM of the first CXL storage 610_1 may store original user data UD1**_*o* and copy user data UD2_*c*1. The nonvolatile memory NVM of the second CXL storage 610_2 may store copy user data UD1_*c*1 and original user data UD2_*o*. The nonvolatile memory NVM of the m-th CXL storage **610_*m* may store copy user data UD1**_*c*2.

The copy user data UD1_*c*1 and the copy user data UD1_*c*2 may be copies of the original user data UD1_*o*. For example, contents of the original user data UD1_*o*, contents of the copy user data UD1_*c*1, and contents of the copy user data UD1_*c*2 may be identical to each other. As in the above description, the copy user data UD2_*c*1 may be a copy of the original user data UD2_*o*.

For clarity and readability, only some user data are illustrated, but embodiments are not limited thereto. For example, any other original user data and any other copy user data may be further stored in the plurality of CXL storages 610_1 to **610_*m*, or may be distributed and stored in any other CXL storage of any other computing system communicating with the computing system 600** over the network NT.

The CXL memory 620 may include a CXL memory controller 621 and the buffer memory BFM. The CXL memory controller 621 may communicate with the plurality of CXL storages 610_1 to **610_*m* through the CXL switch SW_CXL. The CXL memory controller 621 may be connected with the network NT through the CXL switch SW_CXL and the network interface card 602**, and may communicate with another CXL memory controller of any other CXL memory in any other computing system over the network NT.

The buffer memory BFM may communicate with the CXL memory controller 621. The buffer memory BFM may store the map data that are used to store data in the plurality of CXL storages 610_1 to 610_*m* or to read the stored data. For example, the plurality of CXL storages 610_1 to 610_*m* may store the multiple distributed user data UD1_*o*, UD1_*c*1, UD1_*c*2, UD2_*c*1, and UD2_*o*. The buffer memory BFM may store multiple map data MD1_*o*, MD1_*c*1, MD1_*c*2, MD2_*c*1, and MD2_*o* respectively corresponding to the distributed user data UD1_*o*, UD1_*c*1, UD1_*c*2, UD2_*c*1, and UD2_*o*. The map data may indicate a physical block address of corresponding user data and a logical block address of the corresponding user data.

The CXL memory controller 621 may perform load balancing and distributed file management on user data distributed and stored in the plurality of CXL storages 610_1 to 610_*m*. The load balancing may refer to an operation of selecting a CXL storage suitable to communicate with a host from among multiple CXL storages where user data are distributed and stored. The distributed file management may refer to an operation of managing the access to user data distributed and stored in the computing system 600 and any other computing system that communicates over the network NT.

The CXL memory controller 621 of the CXL memory 620 may include a control path and a data path.

The control path may refer to a path where various functions such as management of CXL storage and map data are performed. The control path may include a distribution manager and a user data manager. The data path may refer to a path where actual data are transferred. The data path may include a metadata buffer and an input/output stream manager.

In an embodiment, the control path and the data path may be separated from each other. For example, the data path may be implemented with a high-performance circuit, device or module for the purpose of transferring a relatively large amount of data, and the control path may be implemented with a lower performance circuit, device or module for the purpose of transferring a relatively small amount of data. As another example, the control path may be implemented by software, and the data path may be implemented with hardware. However, embodiments are not limited thereto.

The distribution manager may periodically update telemetry information from the plurality of CXL storages 610_1 to 610_*m* through the CXL switch SW_CXL. The distribution manager may receive a request (e.g., a read or write request) for processing of target user data from the host 601. The distribution manager may analyze the updated telemetry information and may select a CXL storage which is the most suitable to process the request from the host 601 from among the plurality of CXL storages 610_1 to 610_*m*.

The telemetry information may include at least one of the following for each of the plurality of CXL storages 610_1 to 610_*m*: an execution state indicating whether the corresponding CXL storage performs any operation such as a read operation or a write operation, a residual capacity of the nonvolatile memory NVM of the corresponding CXL storage, an I/O bandwidth indicating input/output data of the corresponding CXL storage per unit time, a rate of operation (e.g. a usage of computational resources) of a processor in the corresponding CXL storage, and a usage of a data buffer of the corresponding CXL storage.

In an embodiment, the distribution manager may manage global telemetry information. The global telemetry information may include telemetry information received from another distribution manager of another CXL memory in another computing system communicating through the network NT and a network bandwidth of the another computing system. The distribution manager may periodically update global telemetry information from another computing system over the network NT. The distribution manager may determine whether the computing system 600 is suitable to process the request of the host 601, based on the request from the host 601, the telemetry information, and the global telemetry information.

When it is determined that the computing system 600 is suitable to process the request of the host 601, the distribution manager may select a CXL storage which is the most suitable to process the request from the host 601 from among the plurality of CXL storages 610_1 to 610_*m*.

When it is determined that the computing system 600 is not suitable to process the request of the host 601, the distribution manager may redirect the request of the host 601 to another distribution manager of another CXL memory in another computing system over the network NT.

The user data manager may analyze a plurality of map data of the buffer memory BFM and may generate metadata including map data of user data of the CXL storage selected by the distribution manager.

The user data manager may manage original user data and copy user data distributed and stored in the plurality of CXL storages 610_1 to 610_*m*.

In an embodiment, the user data manager may generate copy user data. For example, the first CXL storage 610_1 may store the original user data UD1_*o* based on a write request from the host 601. The user data manager may generate the map data MD1_*c*1 of the copy user data UD1_*c*1 and may store the map data MD1_*c*1 in the buffer memory BFM. The user data manager may provide a copy request including the map data MD1_*c*1 to the first CXL storage 610_1. The first CXL storage 610_1 may copy the original user data UD1_*o* based on the copy request and may provide the copy user data UD1_*c*1 to the second CXL storage 610_2 through the CXL switch SW_CXL in the P2P manner.

As in the above description, the user data manager may generate the map data MD1_*c*2 of the copy user data UD1_*c*2 and may store the map data MD1_*c*2 in the buffer memory BFM. The user data manager may provide the copy request including the map data MD1_*c*2 to the first CXL storage 610_1 or the second CXL storage 610_2. The first CXL storage 610_1 or the second CXL storage 610_2 may copy the original user data UD1_*o* or the copy user data UD1_*c*1 based on the copy request and may provide the copy user data UD1_*c*2 to the m-th CXL storage 610_*m* through the CXL switch SW_CXL in the P2P manner.

In an embodiment, the user data manager may manage the reliability of user data based on a vote. For example, the user data manager may fetch the user data UD1_*o*, UD1_*c*1, and UD1_*c*2 from the plurality of CXL storages 610_1 to 610_*m* periodically. Based on the vote of the user data UD1_*o*, UD1_*c*1, and UD1_*c*2, the user data manager may determine whether the data loss occurs, for each of the user data UD1_*o*, UD1_*c*1, and UD1_*c*2. In detail, the user data UD1_*o* may indicate '01010000', the user data UD_c1 may indicate '01010000', and the user data UD_c2 may indicate '01010001' (i.e. data loss occurs for 8-th bit of user data UD1_c2). The user data manager may compare the user data UD1_o, UD1_c1, and UD1_c2. The user data manager may determine that data loss of the user data UD1_c2 has occurred according to a majority vote. The user data manager may discard data, which are determined as the data loss occurs, from among the user data UD1_o, UD1_c1, and UD1_c2 (i.e., may request the corresponding CXL storage to delete user data experiencing the data loss). Based on data, which are determined as the data loss does not occur, from among the user data UD1_o, UD1_c1, and UD1_c2, the user data manager may further generate copy user data (i.e., may request copying loss-free user data from the corresponding CXL storage to another CXL storage).

In an embodiment, the user data manager may determine the number of copy user data, based on a residual capacity of the nonvolatile memory NVM of each of the plurality of CXL storages 610_1 to 610_m or reliability requirement according to firmware. According to the determined number of copy user data, the user data manager may further generate copy user data or may delete unnecessary copy user data.

The metadata buffer may temporarily store metadata generated by the user data manager. The metadata may refer to data describing a characteristic of the user data. The metadata may include map data of user data.

The I/O stream manager may generate I/O stream information under control of the distribution manager and the user data manager. The I/O stream information may indicate a data path optimized between the host 601 and the CXL storage selected from the plurality of CXL storages 610_1 to 610_m.

The I/O stream information may include input stream information corresponding to an object to read target user data corresponding to the request of the host 601 and output stream information corresponding to an object to provide the target user data.

For example, the host 601 may provide the CXL memory 620 with a request corresponding to target user data. Under control of the distribution manager and the user data manager, the I/O stream manager may determine that the first CXL storage 610_1 is suitable to process the request of the host 601. The I/O stream manager may generate the I/O stream information including the input stream information and the output stream information. The input stream information may indicate one of the host 601 and the first CXL storage 610_1. The output stream information may indicate the other of the host 601 and the first CXL storage 610_1.

In an embodiment, the I/O stream information may include map data of user data selected by the CXL memory controller 621. For example, the I/O stream manager may obtain the map data of the user data with reference to the metadata of the metadata buffer. The I/O stream manager may generate the I/O stream information including the map data.

The I/O stream manager may provide the host 601 or the corresponding CXL storage with a redirection request including the request from the host 601 and the I/O stream information. The host 601 or the corresponding CXL storage may process target user data according to the I/O stream information, based on the redirection request.

As described above, according to an embodiment, as the CXL memory 620 performs the load balancing and the distributed file management, the load of the host 601 associated with a file management operation may decrease, and a large amount of distributed user data may be efficiently managed without the limitation on the capacity of a host memory (e.g., the plurality of memory devices 102a and 102b of FIG. 2).

Figure 18:
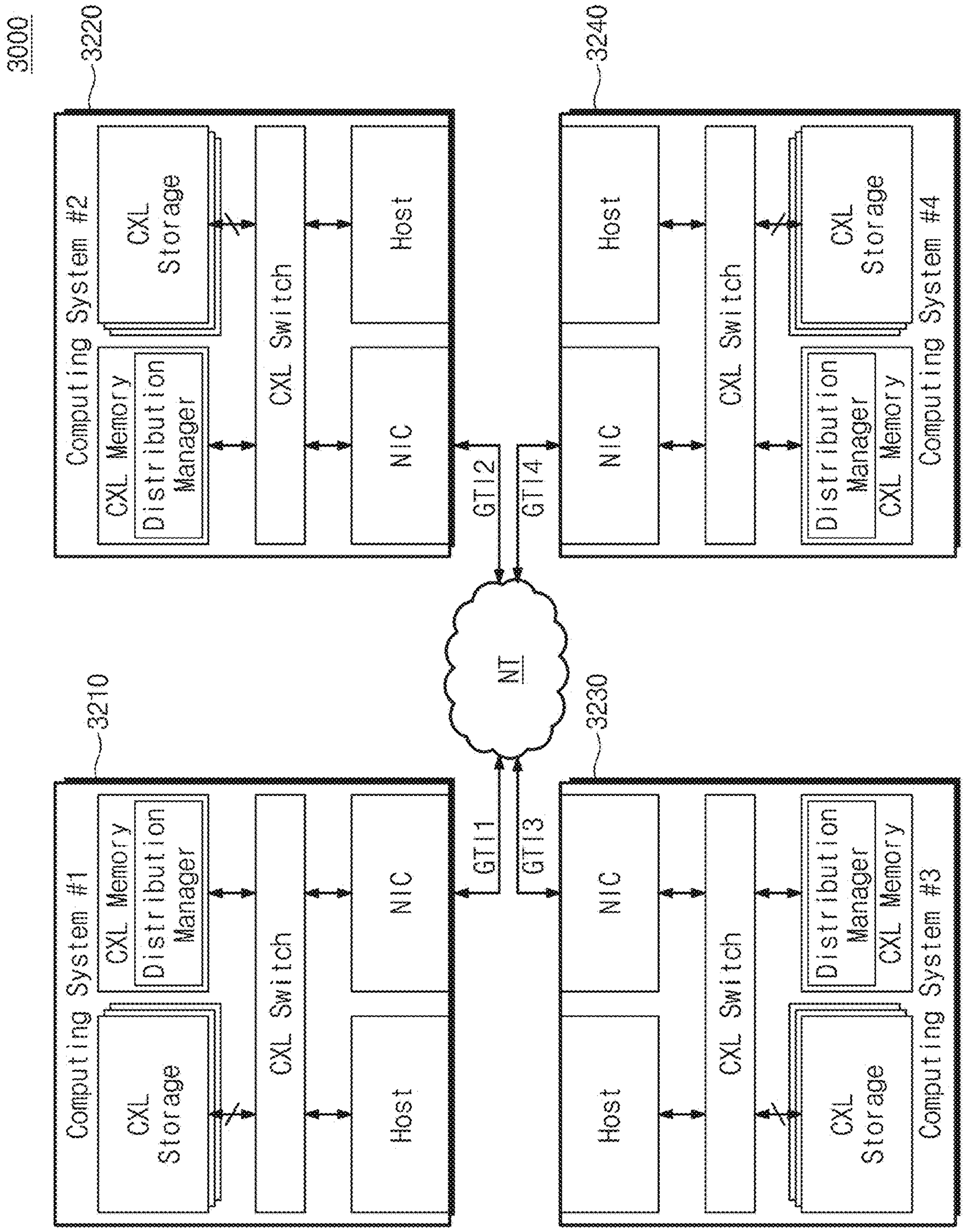
FIG. 18 is a block diagram of a data center according to an embodiment.

FIG. 18 is a block diagram of a data center according to an embodiment. Referring to FIG. 18, a data center 3000 may include first to fourth computing systems 3210, 3220, 3230, and 3240 and the network NT. The first to fourth computing systems 3210, 3220, 3230, and 3240 may be implemented with storage servers.

The first computing system 3210 may include a host, a network interface card NIC, a plurality of CXL storages, a CXL memory, and a CXL switch. The CXL switch may include a distribution manager. The distribution manager may manage telemetry information in the first computing system 3210 and global telemetry information from an external computing system. Each of the second to fourth computing systems 3220, 3230, and 3240 may have a structure similar to that of the first computing system 3210.

In an embodiment, the first to fourth computing systems 3210, 3220, 3230, and 3240 may communicate with each other over the network NT to exchange global telemetry information GTI1, GTI2, GTI3, and GTI4.

The global telemetry information may include telemetry information and a network bandwidth of the corresponding computing system. For example, the first global telemetry information GTI1 may include telemetry information corresponding to CXL storages of the first computing system 3210 and a network bandwidth dependent on the network interface card NIC of the first computing system 3210. As in the above description, the second to fourth global telemetry information GTI2, GTI3, and GTI4 may include telemetry information and network bandwidths of the second to fourth computing systems 3220, 3230, and 3240. The global telemetry information may be used to determine whether each of the computing systems 3210, 3220, 3230, and 3240 internally process user data or provides the redirection request to any other computing system.

Figure 19:
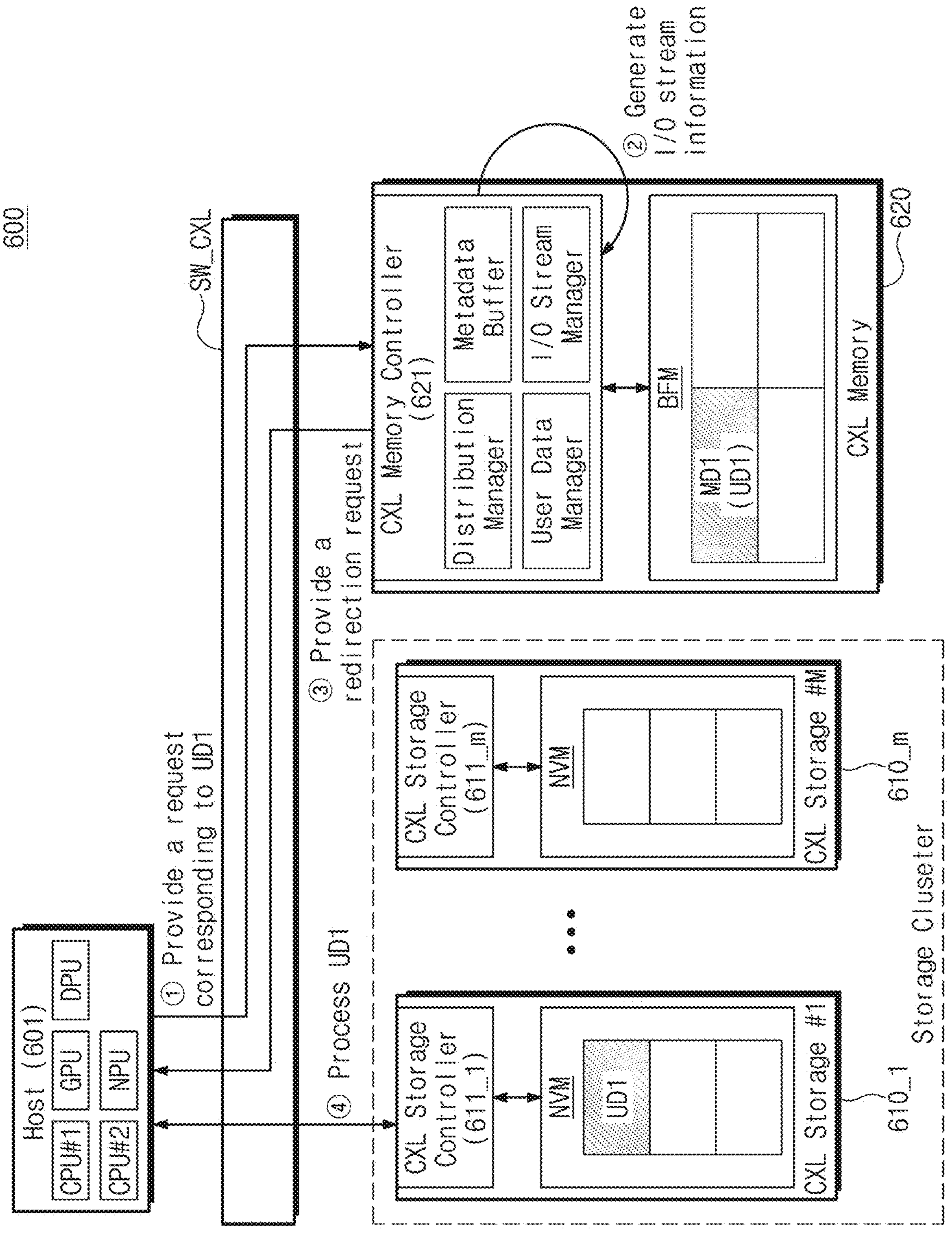
FIG. 19 is a diagram describing a method of operating a computing system according to an embodiment.

FIG. 19 is a diagram describing a method of operating a computing system according to an embodiment. Referring to FIG. 19, the computing system 600 may include the host 601, the CXL switch SW_CXL, the plurality of CXL storages 610_1 to 610_m, and the CXL memory 620. The plurality of CXL storages 610_1 to 610_m may be referred to as a "storage cluster".

Below, a method of operating the computing system 600 according to an embodiment will be described.

In a first operation ①, the host 601 may provide a request corresponding to the first user data UD1 to the CXL memory 620 through the CXL switch SW_CXL. The request may refer to a request associated with the first user data UD1, such as a read request for the first user data UD1 or a write request for the first user data UD1.

In a second operation ②, based on the request in the first operation ①, the CXL memory 620 may analyze telemetry information of the plurality of CXL storages 610_1 to 610_m and a plurality of map data in the buffer memory BFM and may generate I/O stream information indicating an optimized path between the first CXL storage 610_1 and the host 601. The I/O stream information may include the first map data MD1. The first map data MD1 may indicate the relationship between the physical block address and the logical block address of the first user data UD1.

In a third operation ③, the CXL memory 620 may provide the redirection request, which includes the request in the first operation ① and the I/O stream information in the second operation ②, to the host 601 through the CXL switch SW_CXL.

In an embodiment, by using the CXL.mem of the CXL interface, the CXL memory 620 may provide the redirection request to the host 601 through the CXL switch SW_CXL.

In a fourth operation ④, the host 601 may process the first user data UD1 by communicating with the first CXL storage 610_1 according to the I/O stream information included in the redirection request in the third operation ③.

In an embodiment, the host 601 may process the first user data UD1 by communicating with the first CXL storage 610_1 according to the I/O stream information included in the redirection request by using the CXL.io of the CXL interface.

Figure 20:
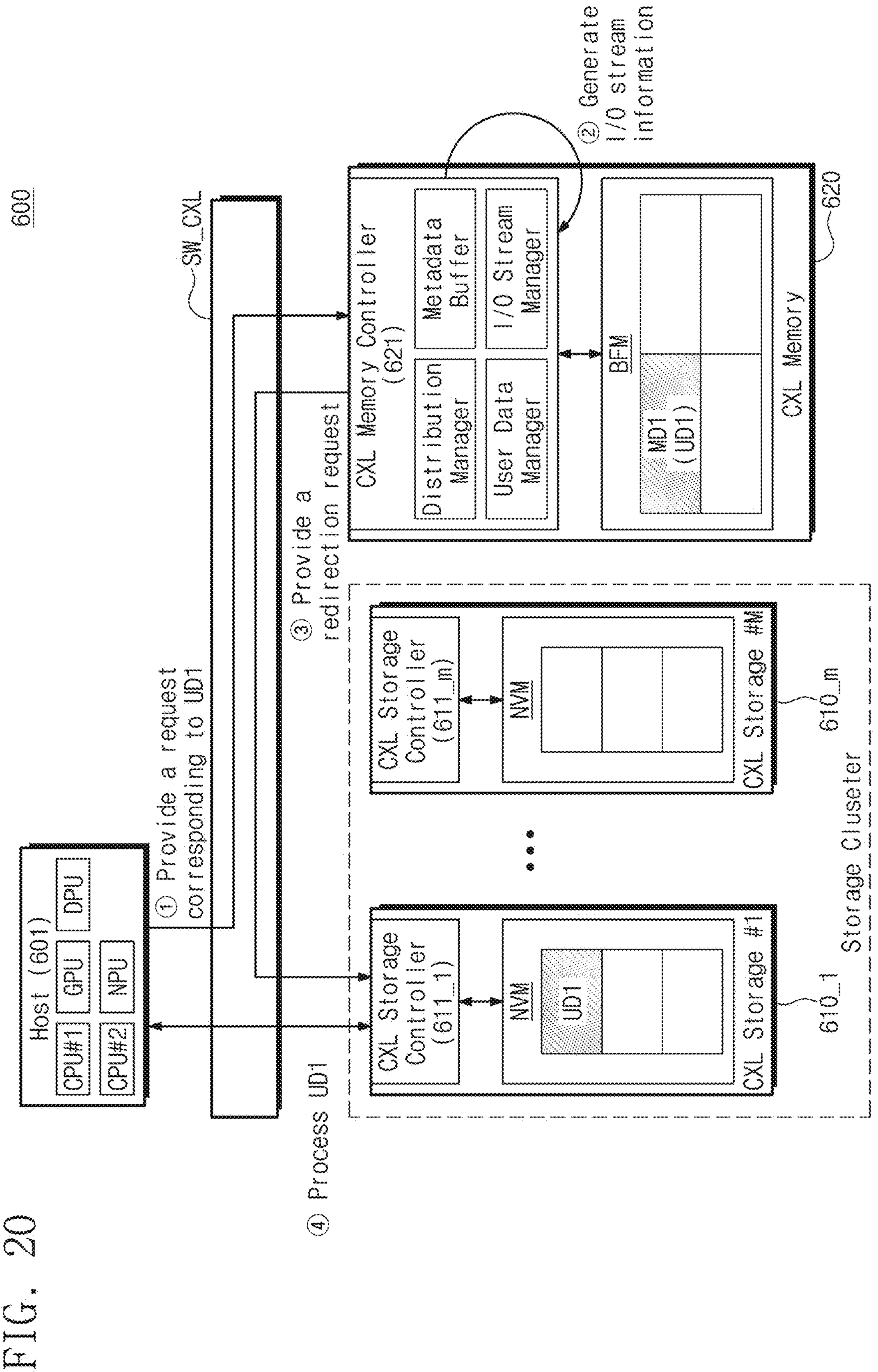
FIG. 20 is a diagram describing a method of operating a computing system according to an embodiment.

FIG. 20 is a diagram describing a method of operating a computing system according to an embodiment. Referring to FIG. 20, the computing system 600 may include the host 601, the CXL switch SW_CXL, the plurality of CXL storages 610_1 to 610_*m*, and the CXL memory 620. The plurality of CXL storages 610_1 to 610_*m* may be referred to as a "storage cluster".

Below, a method of operating the computing system 600 according to an embodiment will be described. A first operation ① and a second operation ② are similar to the first operation ① and the second operation ② of FIG. 19, and thus, additional description will be omitted to avoid redundancy.

In a third operation ③, the CXL memory 620 may provide the redirection request, which includes the request in the first operation ① and the I/O stream information in the second operation ②, to the first CXL storage 610_1 through the CXL switch SW_CXL.

In an embodiment, by using the CXL.mem of the CXL interface, the CXL memory 620 may provide the redirection request to the first CXL storage 610_1 through the CXL switch SW_CXL.

In a fourth operation ④, the first CXL storage 610_1 may process the first user data UD1 by communicating with the host 601 according to the I/O stream information included in the redirection request in the third operation ③.

In an embodiment, the first CXL storage 610_1 may process the first user data UD1 by communicating with the host 601 according to the I/O stream information included in the redirection request by using the CXL.io of the CXL interface.

Figure 21:
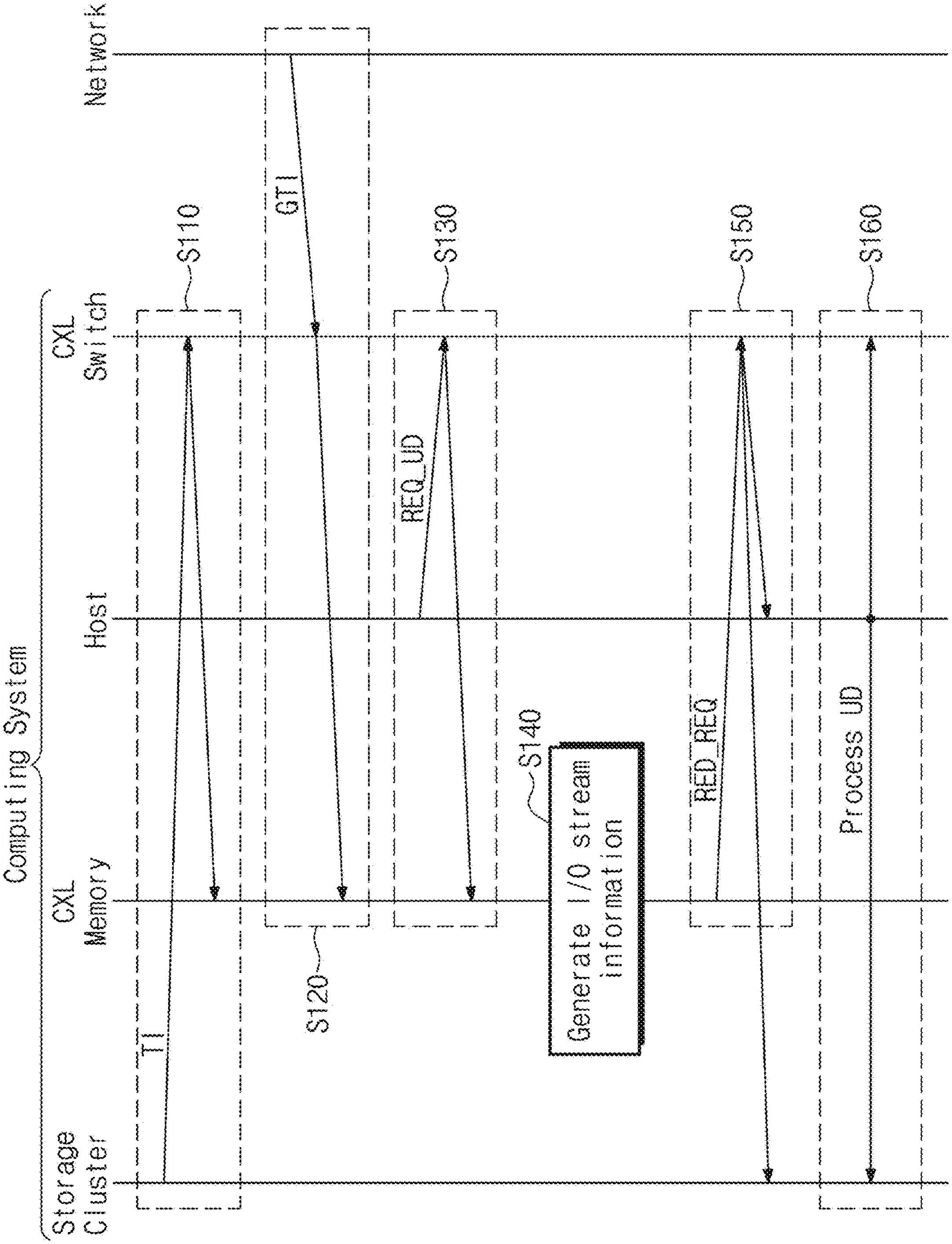
FIG. 21 is a flowchart describing a method of operating a computing system according to an embodiment.

FIG. 21 is a flowchart describing a method of operating a computing system according to an embodiment. Referring to FIG. 21, a computing system may connect to a network. The computing system may communicate with at least one additional computing system over the network. The computing system may include a storage cluster, a CXL memory, a host, and a CXL switch. The storage cluster may include a plurality of CXL storages. Target user data UD may be distributed and stored in the plurality of CXL storages.

In operation S110, the storage cluster may periodically provide telemetry information TI to the CXL memory through the CXL switch. The CXL memory may periodically update the telemetry information TI.

In operation S120, the at least one additional computing system may periodically provide at least one global telemetry information GTI to the CXL memory through the network and the CXL switch. The CXL memory may periodically update the at least one global telemetry information GTI. In an embodiment, when the computing system is implemented with a single server device, operation S120 may be omitted.

In operation S130, the host may provide a request REQ_UD corresponding to the target user data UD to the CXL memory through the CXL switch. For example, the request REQ_UD may refer to the read request for the target user data UD, the write request for the target user data UD, etc.

In operation S140, based on the request REQ_UD, the CXL memory may analyze the telemetry information TI, the at least one global telemetry information GTI, and the plurality of map data in the buffer memory of the CXL memory and may generate I/O stream information indicating an optimized data path between selected CXL storage in the storage cluster and the host.

For example, based on the request REQ_UD, the telemetry information TI, and the at least one global telemetry information GTI, the CXL memory may determine whether the computing system and the at least one additional computing system connected with the computing system over the network are suitable to process the request REQ_UD. The CXL memory may select a computing system for the purpose of processing the request REQ_UD. After selecting the computing system, based on the request REQ_UD, the CXL memory may analyze the telemetry information TI and the plurality of map data and may select a CXL storage suitable to process the target user data UD within the storage cluster. The CXL memory may generate the I/O stream information indicating the optimized data path between the selected CXL storage and the host.

In operation S150, the CXL memory may provide a redirection request RED_REQ including the request REQ_UD and the I/O stream information to the host through the CXL switch. Alternatively, the CXL memory may provide the redirection request RED_REQ including the request REQ_UD and the I/O stream information to the selected CXL storage of the storage cluster through the CXL switch.

In operation S160, the host may process the target user data UD by communicating with the selected CXL storage of the storage cluster through the CXL switch based on the redirection request RED_REQ. Alternatively, the selected CXL storage of the storage cluster may process the target user data UD by communicating with the host through the CXL switch based on the redirection request RED_REQ.

In an embodiment, the computing system may perform the write operation of the distributed storage. For example, operation S130 may include providing the request REQ_UD including a write command of the target user data UD to the CXL memory through the CXL switch. Operation S160 may include writing the target user data UD in the selected CXL storage depending on the I/O stream information included in the redirection request RED_REQ, by the host, or receiving the target user data UD from the host based on the I/O stream information included in the redirection request RED_REQ, by the selected CXL storage.

In an embodiment, after performing the write operation, the computing system may perform a data maintenance operation and a read operation. For example, the selected CXL storage may be referred to as a "first CXL storage". Operation S160 may include writing the target user data UD in the first CXL storage. After operation S160, the method may further include generating copy map data of copy user data of the target user data UD, by the CXL memory, providing a copy request including the copy map data to the first CXL storage through the CXL switch, by the CXL memory, and copying the target user data UD based on the copy request, by the first CXL storage, such that copy user data are provided to second CXL storage in the storage cluster through the CXL switch. After providing the copy user data, the method may further include receiving an additional request including a read command of the target user data UD from the host through the CXL switch, by the CXL memory, generating additional I/O stream information indicating an optimized path between the second CXL storage and the host by analyzing the telemetry information TI and the plurality of map data based on the additional request, providing an additional redirection request including the additional request and the additional I/O stream information to the host or the second CXL storage, and processing the read command based on the additional redirection request, by the host or the second CXL storage.

In an embodiment, the computing system may perform the read operation of the distributed storage. For example, operation S130 may include providing the request REQ_UD including a read command of the target user data UD to the CXL memory through the CXL switch. Operation S160 may include reading the target user data UD from the selected CXL storage according to the I/O stream information included in the redirection request RED_REQ, by the host, or providing the target user data UD to the host based on the I/O stream information included in the redirection request RED_REQ, by the selected CXL storage.

In an embodiment, before performing the read operation, the computing system may perform a write operation and a data maintenance operation. For example, the selected CXL storage may be referred to as a "first CXL storage". In operation S160, the first CXL storage may process the read command of the target user data UD. Before operation S130, the method may further include receiving an additional request including a write command of original user data from the host through the CXL switch, by the CXL memory, generating additional I/O stream information indicating an optimized path between the second CXL storage of the storage cluster and the host by analyzing the telemetry information TI and the plurality of map data based on the additional request, by the CXL memory, providing an additional redirection request including the additional request and the additional I/O stream information to the host or the second CXL storage, and processing the write command based on the additional redirection request, by the host or the second CXL storage. After processing the write command based on the additional redirection request and before operation S130, the method may further include generating the map data of the target user data UD being the copy user data of the original user data, providing the copy request including the map data to the second CXL storage through the CXL switch, by the CXL memory, and copying the original user data based on the copy request, by the second CXL storage, such that the target user data UD are provided to the first CXL storage through the CXL switch.

According to embodiments, a computing system managing distributed storage devices and method of operating the same are provided.

Also, as a memory device performs load balancing and distributed file management, a computing system in which the load of a host associated with an operation decreases and a large amount of distributed user data are efficiently managed without the limitation on the capacity of a host memory, and a method of operating the same are provided.

As used herein, components described with reference to the terms "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

While aspects of embodiments have been particularly shown and described, it will be understood that various changes in form and details may be made therein without departing from the spirit and scope of the following claims.

What is claimed is:

1. A memory device comprising:
- a buffer memory configured to store a plurality of map data for managing a plurality of user data; and
- a memory controller configured to:
  - update storage information corresponding to a plurality of storage devices;
  - receive, from a host device, a request corresponding to target user data of the plurality of user data;
  - generate, based on the request, stream information based on the storage information and the plurality of map data; and
  - provide a redirection request, comprising the request and the stream information, to the host device or a target storage device of the plurality of storage devices.

2. The memory device of claim 1, wherein the storage information indicates at least one of an execution state, a capacity, a bandwidth, a rate of operation of a storage processor, or a usage of a data buffer, which are associated with each of the plurality of storage devices.

3. The memory device of claim 1, wherein the plurality of map data indicate a relationship between a corresponding physical block address and a corresponding logical block address of each of the plurality of user data.

4. The memory device of claim 1, wherein the stream information comprises i) an input stream information corresponding to a first object to read the target user data from and ii) an output stream information corresponding to a second object to provide the target user data to,
- wherein the input stream information indicates a first device among the host device and the target storage device, and
- wherein the output stream information indicates a second device among the host device and the target storage device.

5. The memory device of claim 1, further comprising a switch configured to provide an interface between the plurality of storage devices, the memory device, and the host device,
- wherein the switch supports a Compute Express Link (CXL) interface, and
- wherein the memory controller is further configured to provide the redirection request by using CXL.mem of the CXL interface.

6. The memory device of claim 1, wherein the memory controller is further configured to:
- update the storage information; and
- select the target storage device based on the updated storage information.

7. The memory device of claim 1, wherein the stream information indicates a path between the target storage device and the host device.

8. The memory device of claim 1, wherein the memory controller is further configured to:
- generate metadata comprising map data of the target user data of the target storage device by analyzing the plurality of map data of the buffer memory; and
- manage original user data or copied user data of the target user data.

9. The memory device of claim 1, wherein the memory controller is further configured to:

generate the stream information; and provide the redirection request to the host device or the target storage device.

10. The memory device of claim 1, wherein the memory controller is further configured to control a metadata buffer to store metadata comprising map data of the target user data of the target storage device.

11. The memory device of claim 1, wherein the buffer memory is a Dynamic Random Access Memory (DRAM).

12. A system comprising:

a plurality of storage devices configured to store a plurality of user data;

a memory device comprising a memory controller and a buffer memory configured to store a plurality of map data for managing the plurality of user data; and a switch configured to provide an interface between the plurality of storage devices, the memory device, and a host device, wherein the memory controller is configured to:

periodically update telemetry information corresponding to the plurality of storage devices;

receive, from the host device, a request corresponding to target user data of the plurality of user data;

generate, based on the request, input/output (I/O) stream information based on the telemetry information and the plurality of map data, wherein the I/O stream information indicates a path between a target storage device of the plurality of storage devices and the host device; and provide a redirection request, comprising the request and the I/O stream information, to the host device or the target storage device.

13. The system of claim 12, wherein the telemetry information indicates any one or any combination of an execution state, a capacity, an I/O bandwidth, a rate of operation of a storage processor, and a usage of a data buffer, which are associated with each of the plurality of storage devices.

14. The system of claim 12, wherein the plurality of map data indicate a relationship between a corresponding physical block address and a corresponding logical block address of each of the plurality of user data.

15. The system of claim 12, wherein the I/O stream information comprises i) an input stream information corresponding to a first object to read the target user data from and ii) an output stream information corresponding to a second object to provide the target user data to, wherein the input stream information indicates a first device among the host device and the target storage device, and wherein the output stream information indicates a second device among the host device and the target storage device.

16. The system of claim 12, wherein the switch supports a Compute Express Link (CXL) interface, wherein the memory controller is further configured to provide the redirection request by using CXL.mem of the CXL interface, and wherein the buffer memory is a Dynamic Random Access Memory (DRAM).

17. A method of operating a memory device, the method comprising:

reading a plurality of map data, for managing a plurality of user data, from a buffer memory of the memory device;

receiving, from a host device, a request corresponding to target user data of the plurality of user data;

generating, based on the request, input/output (I/O) stream information based on i) telemetry information corresponding to a plurality of storage devices and ii) the plurality of map data; and providing a redirection request, comprising the request and the I/O stream information, to the host device or a target storage device of the plurality of storage devices.

18. The method of claim 17, wherein the telemetry information indicates at least one of an execution state, a capacity, an I/O bandwidth, a rate of operation of a storage processor, or a usage of a data buffer, which are associated with each of the plurality of storage devices.

19. The method of claim 17, wherein the plurality of map data indicate a relationship between a corresponding physical block address and a corresponding logical block address of each of the plurality of user data.

20. The method of claim 17, wherein the I/O stream information indicates a path between the target storage device and the host device.

* * * * *